United States Patent
Wang et al.

(10) Patent No.: US 11,589,262 B2
(45) Date of Patent: Feb. 21, 2023

(54) METHOD AND APPARATUS FOR DATA TRANSMISSION IN WIRELESS COMMUNICATION SYSTEM

(71) Applicant: Samsung Electronics Co., Ltd., Suwon-si (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/497,216

(22) PCT Filed: Mar. 26, 2018

(86) PCT No.: PCT/KR2018/003541
§ 371 (c)(1),
(2) Date: Sep. 24, 2019

(87) PCT Pub. No.: WO2018/174683
PCT Pub. Date: Sep. 27, 2018

(65) Prior Publication Data
US 2021/0127297 A1  Apr. 29, 2021

(30) Foreign Application Priority Data

Mar. 24, 2017 (CN) .......... 201710187052.8
May 5, 2017 (CN) .......... 201710313118.3
(Continued)

(51) Int. Cl.
*H04W 28/08* (2009.01)
*H04W 28/24* (2009.01)
(Continued)

(52) U.S. Cl.
CPC ....... *H04W 28/08* (2013.01); *H04W 28/0819* (2020.05); *H04W 28/24* (2013.01);
(Continued)

(58) Field of Classification Search
CPC ..... H04W 76/15; H04W 16/06; H04W 28/08; H04W 28/24; H04W 92/20
See application file for complete search history.

(56) References Cited

U.S. PATENT DOCUMENTS

2016/0028585 A1  1/2016  Wager et al.
2016/0044744 A1  2/2016  Lee et al.
(Continued)

FOREIGN PATENT DOCUMENTS

CN  104811984 A  7/2015
CN  104955109 A  9/2015
(Continued)

OTHER PUBLICATIONS

European Office Action dated Feb. 24, 2021, issued in European Application No. 18772534.6.
(Continued)

*Primary Examiner* — Vinncelas Louis
(74) *Attorney, Agent, or Firm* — Jefferson IP Law, LLP

(57) ABSTRACT

A pre-5th-Generation (5G) or 5G communication system is provided for supporting higher data rates beyond 4th-Generation (4G) communication system such as long term evolution (LTE). The method for operating a primary base station in a wireless communication system is provided. The method includes transmitting, to a secondary base station, an addition request message. The addition request message carries information of a secondary cell group (SCG) split bearer. The method further includes receiving, from the secondary base station, a response message of the addition request message.

10 Claims, 18 Drawing Sheets

(30) Foreign Application Priority Data

| Jun. 16, 2017 | (CN) | .......................... 201710458127.1 |
| Jun. 16, 2017 | (CN) | .......................... 201710461743.2 |
| Sep. 5, 2017 | (CN) | .......................... 201710794902.0 |

(51) Int. Cl.
  *H04W 76/15* (2018.01)
  *H04W 92/20* (2009.01)
  *H04W 28/02* (2009.01)

(52) U.S. Cl.
  CPC ........ *H04W 76/15* (2018.02); *H04W 28/0268* (2013.01); *H04W 92/20* (2013.01)

(56) References Cited

U.S. PATENT DOCUMENTS

2017/0215078 A1* 7/2017 Mochizuki ............ H04W 16/06
2019/0342932 A1* 11/2019 Futaki ................... H04W 76/15

FOREIGN PATENT DOCUMENTS

| CN | 105992393 A | 10/2016 |
| JP | 2012-222609 A | 11/2012 |
| WO | 2010/047626 A1 | 4/2010 |
| WO | 2015/046911 A1 | 4/2015 |
| WO | 2016/114612 A1 | 7/2016 |

OTHER PUBLICATIONS

Extended European Search Report dated Feb. 21, 2020, issued in European Application No. 18772534.6.
ZTE: "Further Discussion on SCG Split Bearer Configuration", 3GPP Draft; R3-171557 Further Discussion on SCG Split Bearer Configuration V2, 3rd Generation Partnership Project (3GPP), Mobile Competence Centre ; 650, Route Des Lucioles ; F-06921 Sophia-Antipolis vol. RAN WG3, No. Hangzhou, China; May 15, 2017-May 19, 2017 May 6, 2017 (May 6, 2017), XP051265519.
ITRI: "Split Bearer in NR", 3GPP Draft; R2-166495 Split Bearers in NR, 3rd Generation Partnership Project (3GPP), Mobile Competence Centre ; 650, Route Des Lucioles ; F-06921 Sophia-Antipolis Cedex; France, vol. RAN WG2, No. Kaohsiung; Oct. 10, 2016-Oct. 14, 2016, Sep. 2, 3001 (Sep. 30, 2016), XP051161735.
3GPP TS 36.423 V15.2.0, 3rd Generation Partnership Project; Technical Specification Group Radio Access Network; Evolved Universal Terrestrial Radio Access Network (E-Utran); X2 application protocol (X2AP) (Release 15), Jun. 2018, 650 Route des Lucioles—Sophia Antipolis Valbonne—France.
3GPP TS 38.331 V15.2.1, 3rd Generation Partnership Project; Technical Specification Group Radio Access Network; NR; Radio Resource Control (RRC) protocol specification (Release 15), Jun. 2018, 650 Route des Lucioles—Sophia Antipolis Valbonne—France.
3GPP TS 37.340 V15.2.0, 3rd Generation Partnership Project; Technical Specification Group Radio Access Network; Evolved Universal Terrestrial Radio Access (E-UTRA) and NR; Multi-connectivity; Stage 2 (Release 15), Jun. 2018, 650 Route des Lucioles—Sophia Antipolis Valbonne—France.
3GPP TS 38.304 V15.0.0, 3rd Generation Partnership Project; Technical Specification Group Radio Access Network; NR; User Equipment (UE) procedures in Idle mode and RRC Inactive state (Release 15), Jun. 2018, 650 Route des Lucioles—Sophia Antipolis Valbonne—France.
3GPP TS 36.300 V14.1.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016, 650 Route des Lucioles—Sophia Antipolis Valbonne—France.
3GPP TS 36.423 V14.2.0, 3rd Generation Partnership Project; Technical Specification Group Radio Access Network; (E-UTRAN); X2 application protocol (X2AP) (Release 14), Mar. 21, 2017.
3GPP TR 38.801 V2.0.0, 3rd Generation Partnership Project; Technical Specification Group Radio Access Network Study on New Radio Access Technology; Radio Access Architecture and Interfaces (Release 14), Mar. 6, 2017.
Huawei, TP on SCG SRB establishment procedure, R1-171874, 3GPP TSG-RAN WG3 #96, Hangzhou, China, May 3, 2017.
Korean Office Action dated Apr. 14, 2022, issued in Korean Patent Application No. 10-2019-7031565.
Chinese Office Action dated Jun. 10, 2022, issued in Chinese Patent Application No. 201710794902.0.
Korean Office Action dated Oct. 26, 2022, issued in Korean Patent Application No. 10-2019-7031565.
Chinese Office Action dated Nov. 18, 2022, issued in Chinese Patent Application No. 201710794902.0.
Extended European Search Report dated Dec. 2, 2022, issued in a European Application No. 22191389.0.

* cited by examiner

METHOD AND APPARATUS FOR DATA TRANSMISSION IN WIRELESS COMMUNICATION SYSTEM

TECHNICAL FIELD

This disclosure generally relates to wireless communication system. More specifically, this disclosure relates to data transmission in a wireless communication systems.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), nonorthogonal multiple access (NOMA), and sparse code multiple access (SCMA) as an advanced access technology have been developed.

The term "5G" refers to the fifth generation mobile communication technology. Unlike the previous four generations, 5G is not a single wireless technology, but a fusion of existing wireless communications technologies. Currently, the peak rate of the LTE (Long Term Evolution) can reach 100 Mbps. The peak rate of 5G will reach 10 Gbps, which is 100 times more than that of 4G. Existing 4G networks have limited spontaneous capabilities and cannot support some traffics related to high-definition video, high-quality voice, augmented reality, virtual reality and etc. 5G will solve the problems of 4G networks by introducing more advanced technologies to meet the demand for traffic growth of mobile services by means of more high spectrum efficiency, more spectrum resources and more intensive cells, and etc., and will build a network society with high transmission rate, high capacity, low latency, high reliability and excellent user experience. As shown in FIG. 1, a 5G architecture may include a 5G access network 120 and a 5G core network 130. A UE 110 communicates with a data network 140 through the access network 120 and the core network 130. In the first phase of the network evolution from 4G to 5G, LTE base stations will continue to be used, while 5G terminals and 5G features will be supported. Therefore, some 5G base stations will be deployed, and these base stations can serve as secondary base stations to provide data transmission to UEs together with LTE base stations.

Therefore, a technical solution supporting the network evolution from 4G to 5G is desired.

DISCLOSURE OF INVENTION

Technical Problem

Embodiments of the present disclosure provide a method and an apparatus for data transmission in wireless communication systems.

Embodiments of the present disclosure provide, during the evolution to 5G, it can prevent a UE from accessing or handing over to a 5G base station, establish a horizontal interface between a LTE base station and a 5G base station, ensure that a 5G base station can serve as a secondary base station of the UE, and establish a split bearer on the secondary base station.

Solution to Problem

In one embodiment, a method for configuring a SCG split bearer is provided, The method includes transmitting, by a primary base station, a secondary base station addition request message to a secondary base station, where the secondary base station addition request message carries information of the SCG split bearer; and receiving, by the primary base station, a secondary base station addition response message transmitted by the secondary base station.

For example, the information of the SCG split bearer contains an identity of the SCG split bearer and a first bearer quality requirement corresponding to the SCG split bearer, and wherein the secondary base station addition response message carries an identity of the SCG split bearer and a second bearer quality requirement corresponding to the SCG split bearer.

For example, the first bearer quality requirement includes a total quality requirement parameter of the SCG split bearer, and the total quality requirement parameter is a quality requirement parameter received by the primary base station from a core network.

For example, the first bearer quality requirement includes a quality requirement parameter that the primary base station can share.

For example, the second bearer quality requirement is a quality requirement parameter corresponding to data to be shared by the primary base station which is determined by the secondary base station.

For example, the quality requirement parameter comprises a QoS class indicator (QCI), a priority (ARP), an uplink/downlink maximum rate of a GBR service, and an uplink/downlink guaranteed rate of a GBR service.

For example, the information of the SCG split bearer contains an aggregation rate of a non-GBR service.

For example, the aggregation rate of the non-GBR service is a secondary base station AMBR to be established on the secondary base station and a primary base station AMBR that the primary base station can share, which are determined by the primary base station, and the primary base station AMBR comprises at least an uplink AMBR.

For example, the aggregation rate of the non-GBR service is a total AMBR of the UE and a secondary base station AMBR, or is a total AMBR of the UE and a primary base station AMBR, or is a primary base station AMBR and a secondary base station AMBR, wherein the primary base station AMBR comprises at least an uplink AMBR.

For example, the aggregation rate of the non-GBR service is a secondary base station AMBR and an uplink AMBR supported by the SCG split bearer on the primary base station branch.

For example, the aggregation rate of the non-GBR service is a secondary base station AMBR and the maximum uplink threshold of the SCG split bearer on the primary base station.

For example, the method further comprises: negotiating, by the primary base station with the secondary base station, a different primary base station uplink AMBR; and receiving, by the primary base station, the different primary base station uplink AMBR from the secondary base station via the secondary base station addition response message.

For example, the secondary base station addition request message instructs the secondary base station to configure uplink data split according to the configuration of the primary base station, and when the secondary base station configures a priority cell group as an MCG, the uplink split threshold does not exceed the primary base station uplink AMBR, or does not exceed the uplink AMBR of the SCG split bearer on the primary base station branch, or does not exceed the maximum uplink threshold of the SCG split bearer on the primary base station.

For example, the response carries the information of successfully and/or unsuccessfully establishing the split signaling.

For example, the secondary base station includes a central control unit (CU) and a distribution unit (DU). When the secondary base station receives the request for adding the secondary base station, the CU sends a request for bearer establishment to the DU; and the DU sends a response for bearer establishment to the CU.

For example, after receiving the request for adding the secondary base station, the CU sends the request for bearer establishment to the DU; and after receiving the response for the bearer establishment, the CU sends the response for adding the secondary base station to the DU.

For example, the request for the bearer establishment includes one or more of the identification of a cell, the identification of a bearer, the configuration information of a bearer, and indication information indicating whether the bearer needs traffic control.

For example, the information of the split signaling includes one or more of the followings: the identification of the split signaling, the corresponding quality requirements, the configuration information of the split signaling, and the indication indicating whether it is a default bearer.

For example, if a SCG bearer or SCG split bearer of the cell group of the secondary base station is established in the secondary base station, then: sending, by the primary base station, the request for adding the secondary base station including a message of Quality of Service QoS flow information and/or QoS flow mapping to a data radio bearer DRB to the secondary base station, so that the secondary base station determines the map from the QoS flow to the DRB and/or the quality requirements of the DRB; or the primary base station determines the quality requirements corresponding to the DRB and sends to the secondary base station the request for adding the secondary base station including the message of the QoS flow information and/or QoS flow mapping to the DRB and the quality requirements corresponding to DRB.

For example, if the split signaling bearer is established in the secondary base station, sending, by the primary base station, to the secondary base station the request for adding the secondary base station that includes the identification of the split signaling bearer and corresponding quality requirements.

For example, if the split signaling bearer is established in the secondary base station, sending, by the primary base station, to the secondary base station the request for adding the secondary base station that includes the identification of the split signaling bearer and corresponding information for configuration.

For example, if the split signaling bearer is established in the secondary base station, sending, by the primary base station, to the secondary base station the request for adding the secondary base station that includes the identification of the split signaling bearer and the indication which indicates whether the split signaling bearer uses the default configuration.

For example, if a split signaling bearer is established in the secondary base station, the secondary base station configures the user plane using the default configuration.

For example, when sending data in the bearer, the CU indicates whether the DU needs to perform traffic control, wherein the indication is sent through the user plane or the control plane.

For example, if a SCG bearer or a SCG split bearer is established in the secondary base station, after sending the message for completing the RRC reconfiguration to the secondary base station, a path switch message is sent to the core network.

In another embodiment, a base station (BS) in a wireless communication system is provided. The BS includes at least one processor; and, a memory in communicative connection with the at least one processor; wherein the memory has instructions thereon executable by the one processor, the instructions, when being executed by the at least one processor, causing the at least one processor to perform a method according to an embodiment of the invention.

In yet another embodiment, a method for operating a primary base station in a wireless communication system is provided. The method includes transmitting, to a secondary base station, an addition request message, wherein the addition request message carries information of a secondary cell group (SCG) split bearer; and receiving, from the secondary base station, a response message of the addition request message.

Advantageous Effects of Invention

A method and an apparatus according to various embodiments of the present disclosure allows a 5G terminal to use 5G features, increasing data amount of a user, improving utilization of network frequencies, and trying to reuse the current core network as much as possible.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for data transmission in a wireless communication system.

The terms referring to an addition request message, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
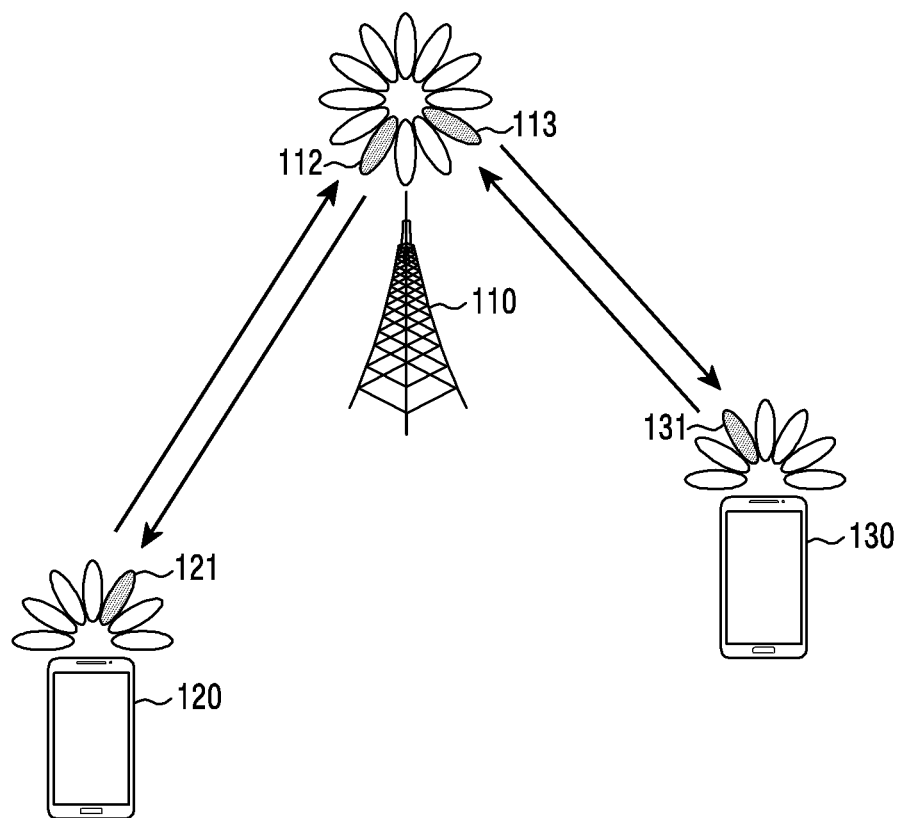
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
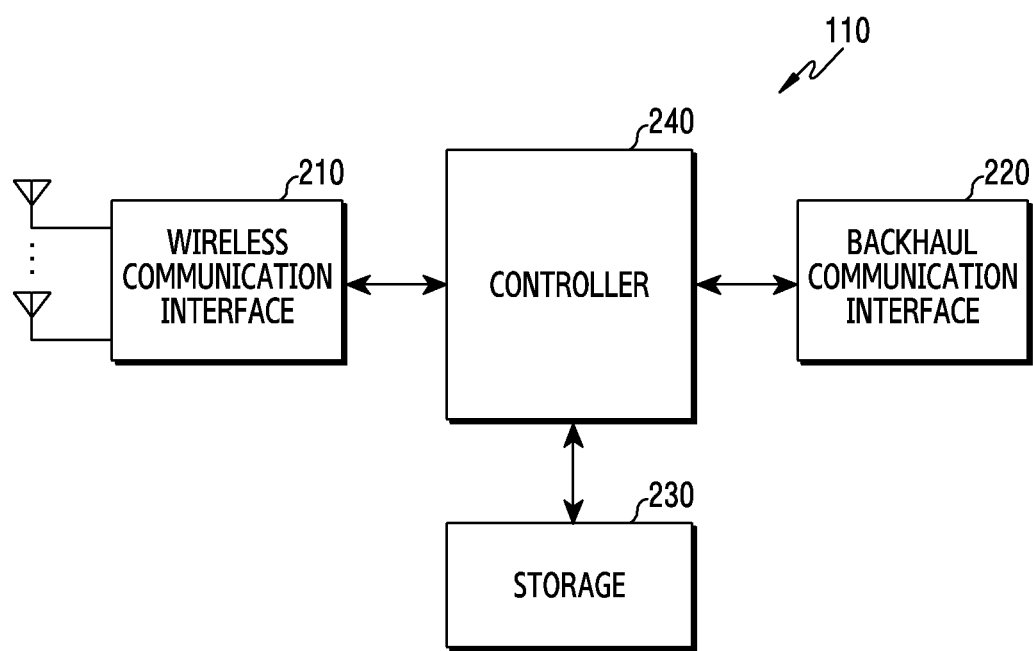
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may transmit, to a secondary base station, an addition request message, wherein the addition request message carries information of a secondary cell group (SCG) split bearer; and receive, from the secondary base station, a response message of the addition request message. For example, the controller 240 may control the base station to perform operations according to the exemplary embodiments of the present disclosure.

Figure 3:
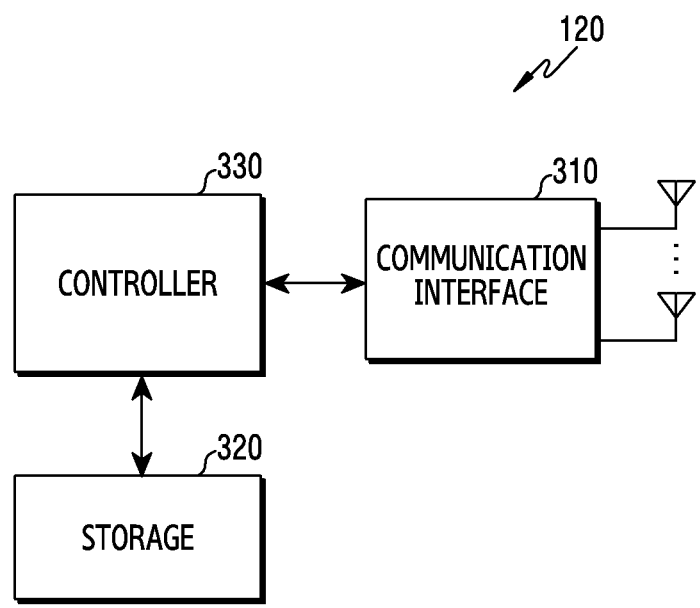
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may control the terminal to perform operations according to the exemplary embodiments of the present disclosure.

Figure 4:
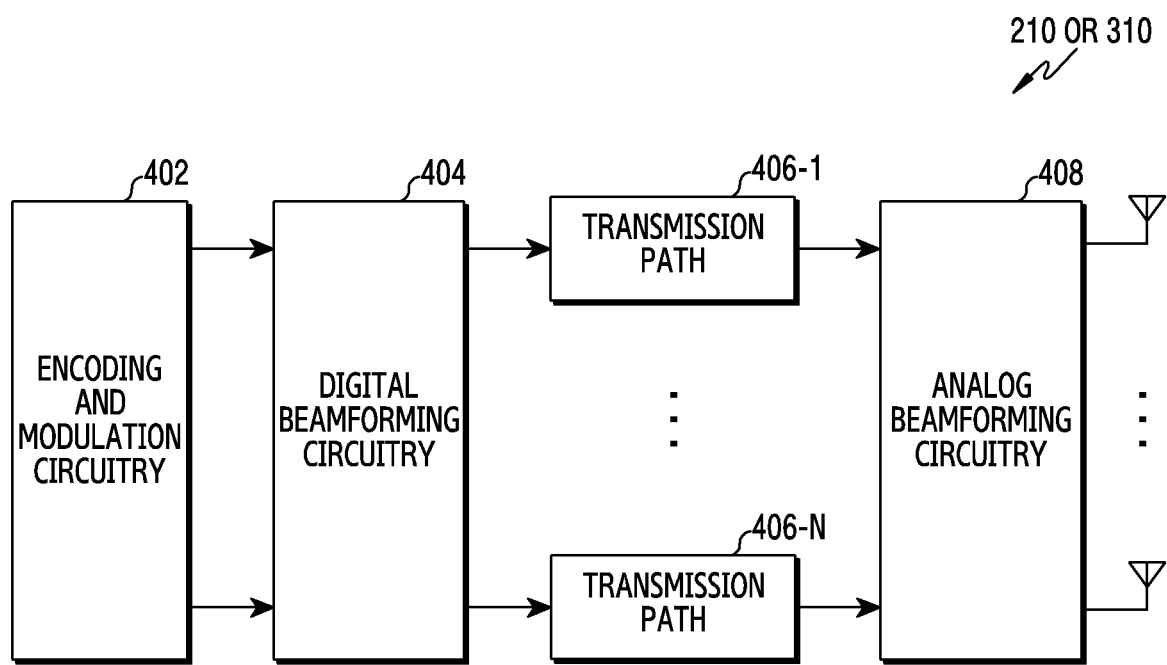
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In order to make the objectives, technical solutions and advantages of the present application more comprehensible, the present application will be further described in detail below with reference to the accompanying drawings. It should be noted that the following description is for illustrative purposes only and is not intended to limit the present disclosure. In the following description, numerous specific details are set forth in order to provide thorough understanding of the present disclosure. However, it will be apparent to one of ordinary skill in the art that the specific details are not necessary to practice the present disclosure. In other instances, well-known circuits, materials, or methods are not described in detail so as not to obscure the present disclosure.

Throughout this specification, references to "one embodiment", "an embodiment", "one example" or "an example" mean that a particular feature, structure, or characteristic described in combination with the embodiment or example is included in at least one embodiment of the present disclosure. Thus, phrases of "in one embodiment", "in an embodiment", "one example" or "an example" occurred in various places throughout the specification are not necessarily all referring to a same embodiment or example. Furthermore, particular features, structures, or characteristics may be combined in one or more embodiments or examples in any suitable combination and/or sub-combination. In addition, it should be understood for those of ordinary skill in the art that the drawings provided herein are for illustrative purposes only, and the accompanying drawings are not necessarily drawn in scale. As used herein, the term "and/or" includes any and all combinations of one or more of items listed in an association.

Figure 6:
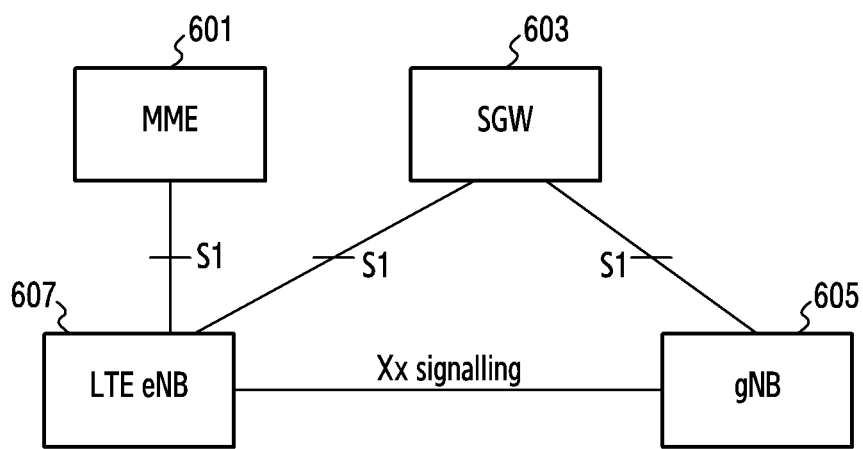
FIG. 6 shows an architecture deployment structure according to an embodiment of the invention.

FIG. 6 shows an architecture deployment structure according to an embodiment of the present disclosure. As shown in FIG. 6, the 5G base station, gNB (gNode B), 605 has no signaling connection with the core network control node MME (Mobility Management Entity) 601, and has only a user plane connection with the core network gateway SGW (Service GateWay) 603. In this architecture, the LTE base station 607 and the LTE core network can be reused, which is attractive to operators. Specially, the 5G base station 605 is configured by the LTE base station 607, and the dual connectivity technology defined in the LTE system is employed to transmit data to the UEs. The LTE base station 607 serves as a primary base station, and the 5G base station 605 serves as a secondary base station. The bearers established on the secondary base station may comprise a SCG (Secondary Cell Group) bearer, a split bearer, and a SCG split bearer. The SCG split bearer is a new type of bearer through which the secondary base station receives data from the core network, and then the data are split, some of the data being transmitted by the secondary base station to the UE, and some of the data transmitted to the primary base station and then transmitted by the primary base station to the UE. In order to support this architecture and this data transmission approach, at least one of the following issues need to be addressed or mitigated:

1) How to prevent a UE from accessing or switching to a 5G base station;
2) How to set up a horizontal interface between a LTE base station and a 5G base station;
3) How to ensure that a 5G base station can serve as a secondary base station for a UE;
4) How to set up a split bearer on a secondary base station.

In the first phase, there is no signaling plane connection between a 5G base station and a LTE core network MME, and a 5G base station only has a data plane connection with a Data Gateway in a LTE core network. In the first phase, a 5G core network has not been deployed yet. Therefore, the 5G base station can only provide data for the UE as a secondary base station, and cannot independently provide service for the UE. Therefore, a 5G base station needs to prohibit a UE from accessing it, and neighboring LTE base stations cannot handover a UE to a 5G base station.

Figure 7:
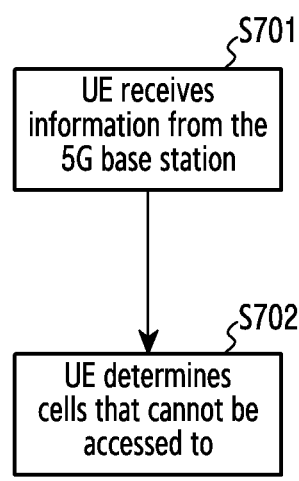
FIG. 7 shows a flowchart of a data transmission method performed by a UE according to an embodiment of the present disclosure.

FIG. 7 shows a method 700 executed by a UE according to an embodiment of the present disclosure. As shown in FIG. 7, in step S701, the UE receives an indication message broadcast by a 5G base station, and knows information of a cell that cannot be accessed. The UE can know that the 5G base station is a special 5G base station according to the indication information.

According to an embodiment of the present disclosure, a "special 5G base station" means that the 5G base station can only serve as a secondary base station to provide data to the UE. The 5G base station has no signaling connection with the MME of the core network, and has only a user plane connection with a data gateway of the core network. The 5G base station notifies the UE that the base station cannot establish a wireless connection with the UE. For example, the 5G base station may send an indication message in broadcast information indicating that the base station is a special 5G base station which cannot normally serve users and cannot establish a wireless connection with the UE. In addition, the 5G base station may be allocated a special frequency or a special cell identity. When the UE receives a special frequency or a special cell identity, it can learn that the base station is a special 5G base station which cannot normally serve users and cannot establish a wireless connection with the UE. In addition, the cell of the 5G base station may be allocated a special operator identifier or a special routing area identifier. The special operator identifier or a special routing area identifier may be transmitted to the UE via the broadcast information. The distinction can also be made in the following way: the broadcast information of the independent 5G base station contains indication information, while the broadcast information of the special 5G base station does not contain indication information. The independent 5G base station refers to a 5G base station that has a connection to a 5G core network and has no connection to an LTE core network.

Next, in step S702, the UE determines cells that cannot be accessed to. For example, the UE may perform cell search after powering on. If a physical layer signal transmitted by a cell on a 5G base station is received, the broadcast information of the cell is read and it finds that the base station on which the cell is located is a special 5G base station that cannot normally serve the UE, the UE may save the cell in a list of access-disallowed cells.

With the method shown in FIG. 7, it can prevent the UE from accessing to a special 5G base station.

Figure 8:
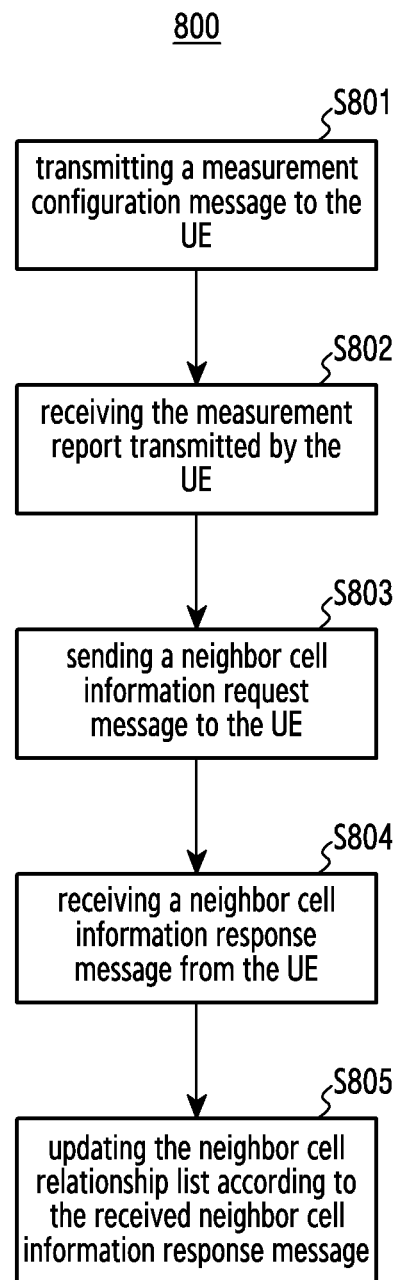
FIG. 8 shows a flow chart of a data transmission method performed by an LTE base station according to an embodiment of the present disclosure.

FIG. 8 shows a data transmission method 800 according to an embodiment of the present disclosure. The data transmission method 800 is performed by a base station of a first network. The following describes an example in which a base station of a first network is an LTE base station eNB and a base station of a second network is a 5G base station gNB. As shown in FIG. 8, in step 801, a base station of a first network, for example, an LTE base station eNB, transmits a measurement configuration message to the UE. The measurement configuration message may carry mode information and frequency list to be measured, and may also carry configuration information for cell measurement reporting by the UE. In response to the measurement configuration message, the UE may measure cells of other access modes/other frequencies among neighbor cells. In order to enable the UE to make measurements, the LTE base station eNB needs to schedule some idle times for the UE. In these times, the UE does not receive data in the serving cell, but performs cell signal measurement on a corresponding frequency by using a corresponding access technology.

Next, in step S802, the LTE base station receives the measurement report transmitted by the UE.

The UE measures the received cell physical layer signal according to the received information such as the received access mode and frequencies of the neighbor cells. If a cell with a strong signal is detected and the condition for reporting a cell measurement is satisfied, the UE sends the detected cell's physical layer identifier to the LTE base station. The format of the physical layer identifier may vary with the detected cell access mode. In the case of an LTE cell, the identifier of the physical layer may be a PCI (Physical Cell Identifier). According to an embodiment of the present disclosure, the neighbor cell may be a cell of a 5G base station, and a physical layer identifier of a 5G cell may be a PCI or other name.

In step S803, the LTE base station sends a neighbor cell information request message to the UE.

If the LTE base station eNB needs to obtain more information about the neighbor cell, the LTE base station eNB sends a neighbor cell information request message to the UE, to instruct the UE to read the broadcast information of the cell corresponding to the newly discovered physical layer identifier. The UE may read at least one of a unique cell global identifier ECGI, a location routing area identifier and an operator identifier PLMN ID(s) broadcasted on the broadcast channel.

In step S804, the LTE base station receives a neighbor cell information response message from the UE.

In the above step S302, the UE listens to the broadcast information of the neighbor cells at the configured times. In the example, the neighbor cell is a 5G cell and the 5G base station on which the 5G cell is located is a special 5G base station. As described above, the special 5G base station has no signaling connection with the MME of the core network and has only a user plane connection with the data gateway of the core network. As described above, the 5G base station on which the 5G cell is located notifies the UE that the 5G base station cannot establish a wireless connection with the UE. For example, the 5G base station may send indication information in the broadcast information indicating that the base station is a special 5G base station which cannot normally serve the UE and cannot establish a wireless connection with the UE. Alternatively, the 5G base station may be allocated at least one of a special frequency, a special cell identity, a special operator identity, and a special routing area identity. When receiving the indication information, the UE learns that the 5G base station is a special 5G base station which cannot normally serve the UE and cannot establish a wireless connection with the UE.

In response to the neighbor cell information request message from the LTE base station, the UE reads the broadcast information, includes at least one of e.g. the unique cell global identifier ECGI, the location routing area identifier and the operator identifier PLMN ID(s) it read in the neighbor cell information response message, and transmits the neighbor cell information response message to the LTE base station eNB. In this embodiment, the UE also reads the indication information broadcast by the 5G base station which indicates that the base station is a special 5G base station which cannot normally server the UE and cannot accept handover. Accordingly, when the UE sends a neighbor cell information response message to the LTE base station, the neighbor cell information response message may further carry indication information to indicate that the base station on which the cell is located is a special 5G base station which cannot normally serve the UE and cannot accept handover.

In step S805, the LTE base station eNB updates the neighbor cell relationship list according to the received neighbor cell information response message. In the neighbor cell relationship list, the unique identifier of the cell is saved and the attribute is set as "handover disallowed" to indicate that the LTE base station eNB will not initiate a handover procedure with the 5G base station as a target base station, and for example, the handover comprises S1 handover and X2 handover.

According to an embodiment of the present disclosure, the LTE base station eNB is prohibited from handing over the UE to a 5G base station by using Automatic Neighbor Relation (ANR) function. The ANR function on the LTE base station eNB manages the relationship with the neighbor cells through a neighbor cell relationship list. A newly discovered cell may be added to the neighbor cell relationship list, and a cell may also be deleted from the neighbor cell relationship list. The neighbor cell relationship list maintains the relationship between the serving cell and the neighbor cells. The information stored in the neighbor cell relationship list may include the unique global identifier ECGI of the neighbor cell and the physical layer identifier PCI, and may also include three attributes: "delete disallowed", indicating that the LTE base station cannot delete the neighbor cell relationship from the list, if this attribute is set; "handover disallowed", indicating that the LTE base station cannot initiate a handover process to the cell, if this attribute is set, and "no X2 interface", indicating that the LTE base station cannot use a procedure on X2 interface to the cell, if this attribute is set. The ANR function is implemented on the LTE base station eNB. The LTE base station eNB may configure the UE in Radio Resource Control (RRC) connected state to measure signals of other access modes surrounding and cells of different frequencies. The LTE base station eNB may employ different strategies to configure the UE to perform and report measurements.

The ANR process can also be used for establishment of a horizontal interface between base stations. According to an embodiment of the present disclosure, an interface between an LTE base station and a 5G base station is referred to as an "Xx interface." The LTE base station has connections to MMEs and data gateways of the core network, but not all of the MMEs and the data gateways of the core networks. The 5G base station has only connections to LTE data gateways, but not all of the LTE data gateways. If dual connectivity is required to establish, the 5G base station and the LTE base station should be able to connect to a same data gateway of the core network. However, the 5G base station has no connection with MMEs. According to the current base station, the LTE base station cannot confirm whether the 5G base station is connected to the same data gateway of core network to which it connects. For example, in the method shown in FIG. 8, the LTE base station does not make such a determination. Upon receiving the measurement report from the UE, the LTE base station may initiate an establishment of an Xx interface with the 5G base station. In this case, the LTE base station may decide to establish dual connectivity and send a dual connectivity establishment request message to the 5G base station, where the dual connectivity establishment request includes the IP address of the data gateway. According to the IP address, the 5G base station discovers that it has no data connection with the data gateway, so the 5G base station sends a reject message. Until receiving the reject message, the LTE base station learns that the 5G base station and the LTE base station cannot connect to a same data gateway.

Figure 9:
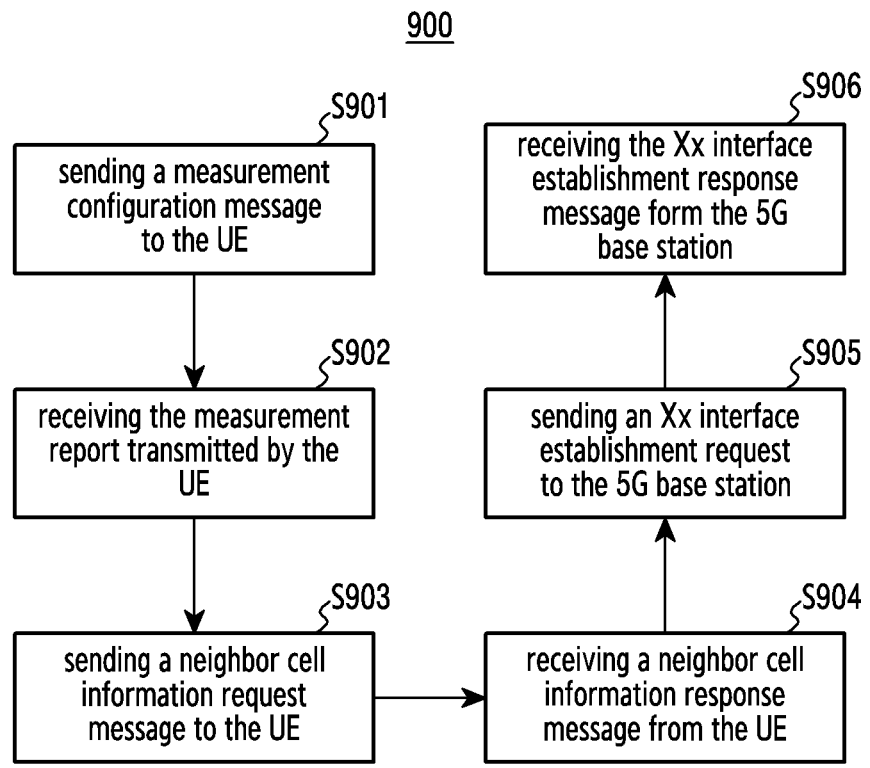
FIG. 9 shows a flow chart of a data transmission method performed by an LTE base station according to another embodiment of the present disclosure.

FIG. 9 shows a flowchart of a data transmission method 900 according to another embodiment of the present disclosure. Similar to the embodiment shown in FIG. 8, the data transmission method 900 is performed by a base station of a first network. The following describes an example in which a base station of a first network is an LTE base station eNB and a base station of a second network is a 5G base station gNB. According to the present embodiment, the LTE base station may determine whether the 5G base station can be configured as a secondary base station before the establishment of the Xx interface. If it can, the establishment of the Xx interface will be initiated; otherwise, the establishment of the Xx interface will not be initiated. After dual connectivity is established, the LTE base station selects only the 5G base stations that have established the Xx interfaces with the LTE base station as secondary base stations, so that the above rejection process will not occur.

In step S901, the LTE base station eNB sends a measurement configuration message to the UE.

The measurement configuration message may carry mode information and frequency list to be measured, and may also carry configuration information for cell measurement reporting by the UE. In response to measuring the configuration message, the UE may measure cells of other access modes/other frequencies among neighbor cells. In order to enable the UE to make measurements, the LTE base station eNB needs to schedule some idle times for the UE. In these times, the UE does not receive data in the serving cell, but performs cell signal measurement on a corresponding frequency by using a corresponding access technology.

Next, in step S902, the LTE base station receives the measurement report transmitted by the UE.

The UE measures the received cell physical layer signal according to the received information such as the received access mode and frequencies of the neighbor cells. If a cell with a strong signal is detected and the condition for reporting a cell measurement is satisfied, the UE sends the detected cell's physical layer identifier to the LTE base station. The format of the physical layer identifier may vary with the detected cell access mode. In the case of an LTE cell, the identifier of the physical layer may be a PCI. According to an embodiment of the present disclosure, the neighbor cell may be a 5G cell, and a physical layer identifier of a 5G cell may be a PCI or other name.

In step S903, the LTE base station sends a neighbor cell information request message to the UE.

If the LTE base station eNB needs to obtain more information about the neighbor cell, the LTE base station eNB sends a neighbor cell information request message to the UE, to instruct the UE to read the broadcast information of the cell corresponding to the newly discovered physical layer identifier. The UE may read at least one of a unique cell global identifier ECGI, a location routing area identifier and an operator identifier PLMN ID(s) broadcasted on the broadcast channel.

In step S904, the LTE base station receives a neighbor cell information response message from the UE.

In the above step S302, the UE listens to the broadcast information of the neighbor cells at the configured times. In the example, the neighbor cell is a 5G cell and the 5G base station on which the 5G cell is located is a special 5G base station. As described above, the 5G base station has no signaling connection with the MME of the core network and has only a user plane connection with the data gateway of the core network. As described above, the 5G base station on which the 5G cell is located notifies the UE that the 5G base station cannot establish a wireless connection with the UE. For example, the 5G base station may send indication information in the broadcast information indicating that the base station is a special 5G base station which cannot normally serve the UE and cannot establish a wireless connection with the UE. Alternatively, the 5G base station may be allocated at least one of a special frequency, a special cell identity, a special operator identity, and a special routing area identity. When receiving the indication information, the UE learns that the 5G base station is a special 5G base station which cannot normally serve the UE and cannot establish a wireless connection with the UE.

In response to the neighbor cell information request message from the LTE base station, the UE reads the broadcast information, includes at least one of e.g. the unique cell global identifier ECGI, the location routing area identifier and the operator identifier PLMN ID(s) it read in the neighbor cell information response message, and transmits the neighbor cell information response message to the LTE base station eNB. In this embodiment, the UE also reads the indication information broadcast by the 5G base station which indicates that the base station is a special 5G base station which cannot normally server the UE and cannot accept handover. Accordingly, when the UE sends a neighbor cell information response message to the LTE base station, the neighbor cell information response message may further carry indication information to indicate that the base station on which the cell is located is a special 5G base station which cannot normally serve the UE and cannot accept handover.

In step 905, the LTE base station sends an Xx interface establishment request to the 5G base station.

The LTE base station receives the neighbor cell information response message transmitted by the UE, obtaining at least one of the unique cell identifiers, the operator identifiers and the routing area identifiers of surrounding 5G cells. If the report received by the LTE base station from the UE includes the indication information indicating that a neighbor 5G base station is a special 5G base station, the LTE base station further determines whether to establish an Xx interface with the 5G base station. The determined criteria may be based on the operator's configuration. The operator configures a group of lists of unique cell identifiers that may establish Xx interfaces. The LTE base station determines whether to establish an Xx interface with the base station on which the 5G cell is located by comparison. Alternatively, the LTE base station sets the routing area identifier of the base station on which the 5G cell is located to be the same as the routing area identifier of the LTE cell. By using the routing area identifier, the LTE base station determines whether to establish an Xx interface with the base station on which the 5G cell is located. The LTE base station may obtain the IP address of the 5G base station without initiating S1 process, e.g. may obtain the IP address of the 5G base station by querying the Operation Administration and Maintenance (OAM) configuration information, or may obtain the IP of the 5G base station by querying the Domain Name System (DNS) address. If the LTE base station determines to establish an Xx interface with the 5G base station, the LTE base station sends an Xx interface establishment request message to the 5G base station. The Xx interface establishment request message may carry information of the LTE cell.

In step S906, the LTE base station receives the Xx interface establishment response message from the 5G base station. The Xx interface establishment response message may carry information of the 5G cell, including but not limited to unique cell identifier, frequency and routing area.

Specially, one of the following methods may be used:

(1) Pre-configuring, on the 5G base station, information of the MME pool, i.e. the operator identifier and the MME group identifier. When a 5G base station receives an Xx interface establishment request message, the 5G base station sends an Xx interface establishment response message, which contains the information of the MME pool. After receiving the Xx interface establishment response message, the LTE base station determines, according to the information of the MME pool reported by the 5G base station, whether the 5G base station can serve as a secondary base station. The basis of the determination may be that, if the MME pool reported by the 5G base station is same as the MME pool connected with the LTE base station, the 5G base station may be configured as a secondary base station of the UE.

(2) Pre-configuring, on the 5G base station, a list of identifiers of LTE base stations that can act as primary base stations. When receiving an Xx interface establishment request message, the 5G base station sends a successful Xx interface establishment response message only if the Xx interface establishment request message is initiated by a base station in the list; otherwise, the 5G base station sends a failure message.

(3) Pre-configuring, on the LTE base station, a list of identifiers of 5G base stations that can serve as secondary base stations. Only the 5G base stations in the list may be configured as secondary base stations of the UE.

After establishing the Xx interface, the LTE base station may decide to configure a neighbor 5G base station as a secondary base station to transmit service data for the UE. The service data may be transmitted to the UE through the LTE base station and the 5G base station, that is, the data is transmitted to the UE through two data connections, which is called dual connectivity. Traditional dual connectivity may include several approaches, which are not described herein again. The SCG split bearer is introduced in the 5G. Over this kind of bearer, the 5G base station receives data from the gateway of the core network, and then splits the data into two paths, in one path the data is transmitted to the LTE base station through the Xx interface and then transmitted to the UE by the LTE base station, and in the other path the data is transmitted to the UE through the 5G base station.

Figure 10:
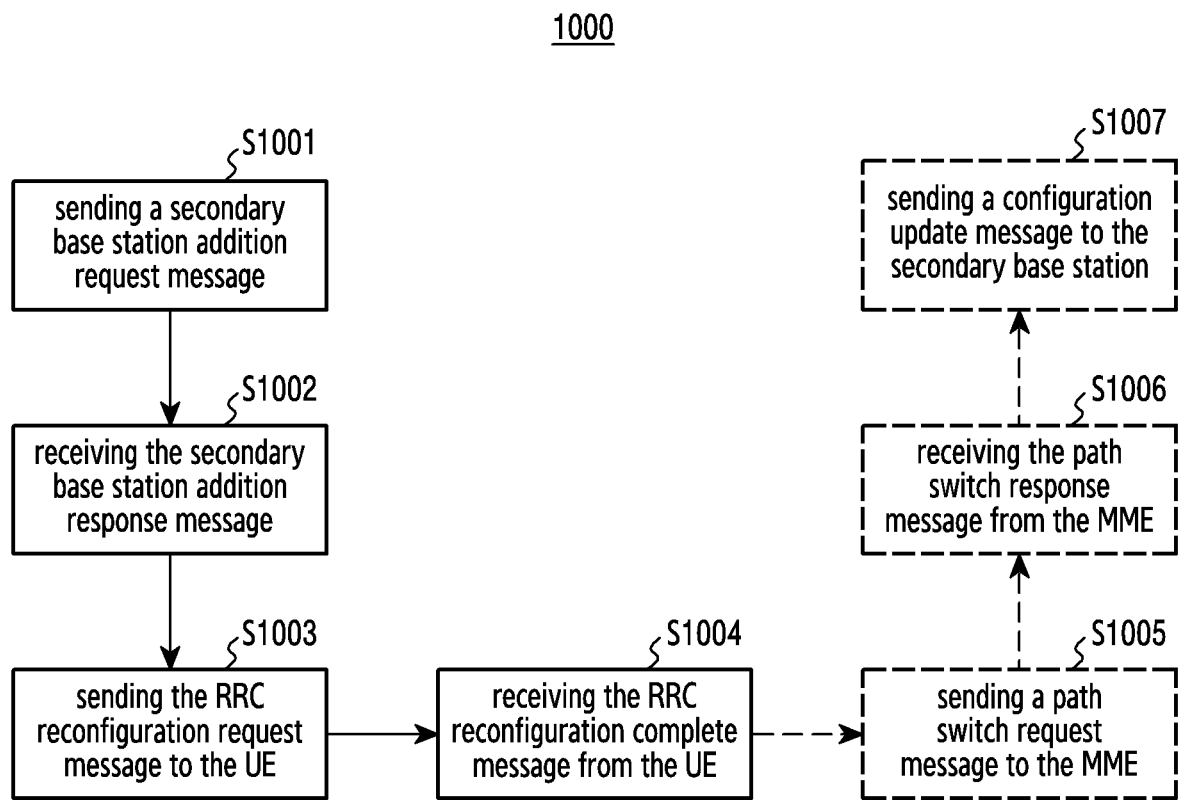
FIG. 10 shows a flowchart of a data transmission method performed by a primary base station according to an embodiment of the present disclosure.

FIG. 10 shows a flowchart of a data transmission method 1000 according to an embodiment of the present disclosure.

In step S1001, the primary base station (e.g., LTE base station) sends a secondary base station addition request message to the secondary base station (e.g., a 5G base station).

The primary base station determines to establish the data connection on a new secondary base station. This bearer may a bearer previously established on the source secondary base station or on the primary base station, or is a new bearer configured by the MME. The secondary base station addition request message may include an identifier of the bearer, a receiving IP address and tunnel number TEID of the bearer in the gateway of the core network. The secondary base station addition request message may further carry information of capabilities of the UE. The capabilities of the UE may include two types: (1) the capabilities of the UE in the 5G access network, which are not applicable in the LTE access network; and (2) the common capabilities of the UE in the LTE and 5G access networks, which are applicable in both LTE and 5G. The secondary base station addition request message further carries the type of dual connectivity determined by the LTE base station. In this exemplary embodiment, the type of the dual connectivity is SCG split. In order to potentially share part of data transmission later, the primary base station should pre-allocate a downlink data receiving address, including an IP address and a tunnel number, to receive data from the 5G base station. If there is data left on the primary base station that has not be transmitted to the UE, the data needs to be forwarded to the secondary base station, and the primary base station may send to the secondary base station indication information for data forwarding.

The secondary base station determines configuration information of the bearer on the UE according to QoS requirements of the bearer and the UE capabilities. Traditionally, the primary base station firstly determines the configuration information for the UE on the primary bearer, i.e., using part of the UE capabilities, and then sends the configuration information of the primary bearer to the secondary base station. Based on the total UE capabilities and the already used UE capabilities, the secondary base station determines the configuration information of the secondary bear. According to the embodiments of the present disclosure, firstly the secondary base station firstly configures the bearer configuration between the secondary base station and the UE according to the type of the UE capabilities, and then the primary base station determines the bearer configuration between the primary base station and the UE according to the configuration information of the secondary base station. Specially, for the above first kind of the UE capabilities, i.e., the UE capabilities in the 5g access network, the 5G base station may independently determine the configuration of the UE, wherein the configuration information may be contained in a RRC transparent container. By transmitting the secondary base station addition response message to the primary base station, the primary base station does not need to parse the RRC transparent container, but forwards the message to the UE. For the second kind of the UE capabilities, i.e., the common capabilities of UEs in the LTE and 5G networks, the 5G base station determines that part of the UE capabilities are used for the UE configuration, and this part of the UE configuration information may be contained in a separate RRC container and be sent to the primary base station through the secondary base station addition response message. The primary base station reads this part of information, and determines, according to this part of information, the configuration of the radio bearer of the UE on the primary base station, the configuration information for the UE made by the secondary base station in the Xx message, including the UE capabilities already used by the secondary base station or the remaining UE capabilities that is available.

In step S1002, the primary base station receives the secondary base station addition response message from the secondary base station. The secondary base station addition response message may carry SCG bearer configuration information for the UE, and may carry the tunnel number of the downlink data receiving IP address of the S1 interface allocated by the secondary base station. In this exemplary embodiment, the type of dual connectivity is SCG split. If there is data left on the primary base station that has not be transmitted to the UE, the secondary base station needs to allocate a receiving address for forwarding downlink data, including an IP address and a tunnel number, to receive data from the LTE base station and send the data to the UE through the SCG split bearer.

The secondary base station configures the SCG bearer of the UE, which is carried in the RRC container and transmitted to the primary base station. The RRC container may include: a transparent RRC container that is required to be parsed by the primary base station but is not modified by the primary base station; a RRC container that is required to be parsed and used by the primary base station to set the primary bearer; and a transparent RRC container that is not required to be parsed by the primary base station and is not modified by the primary base station, wherein the Xx message carries configuration information made by the secondary base station for the UE, or includes the UE capabilities that the secondary base station has already used or the remaining UE capabilities that is available to be used by the primary base station. Based on this information, the primary base station can configure the primary bearer.

For a transparent RRC container, the primary base station may not parse the RRC container but forward the RRC container to the UE. For the RRC container that is required to be parsed or the information contained in the Xx message, the primary base station configures the bearer configuration of the UE on the primary base station according to available UE capabilities.

In step S1003, the primary base station sends the RRC reconfiguration request message to the UE.

In step S1004, the primary base station receives the RRC reconfiguration complete message from the UE.

Additionally, the data transmission method according to the embodiments of the present disclosure may further comprise the following steps.

In step S1005, when the UE accesses to the secondary base station, the primary base station sends a path switch request message to the MME.

The UE performs a random access process with the new secondary base station to synchronize with the new secondary base station. After the random access procedure is completed, if necessary, the new secondary base station may notify the primary base station of information indicating that the random result is successful. The primary base station may send a path switch request message to the MME. The path switch request message may include an IP address and a TEID (Tunnel Endpoint Identifier) for downlink reception corresponding to the bearer. In this embodiment, in step 1002, the secondary base station may send to the primary base station an IP address and a TEID for downlink reception corresponding to the bearer. The message may be transmitted by the MME to the SGW.

In step S1006, the primary base station receives the path switch response message from the MME. The path switch response message may contain an IP address and a TEID for uplink allocated by the SGW.

In step S1007, if the SGW allocates a new IP address and TEID for uplink, the primary base station sends a configuration update message to the secondary base station, to update the IP address and the TEID of the bearer for uplink. If the SGW uses the old IP address and TEID, i.e. the same IP address and TEID for reception as those in step S1001, there is no need to perform step S1007.

In the first phase, there is no signaling plane connection between a 5G base station and a LTE core network MME, and a 5G base station only has a data plane connection with a Data Gateway in a LTE core network. In the first phase, a 5G core network has not been deployed yet. Therefore, the 5G base station can only provide data for the UE as a secondary base station, and cannot independently provide service for the UE. In the first phase, the 5G base station has no signaling plane connection with the MME of the LTE core network and has only data plane connection with the data gateway of the LTE core network. In the first phase, a 5G core network has not been deployed yet. Therefore, the 5G base station can only provide data for the UE as a secondary base station, and cannot independently provide service for the UE. In this architecture, service data may be transmitted to the UE through the LTE base station and the 5G base station, i.e., the data is transmitted to the UE through two data connections, which is called dual connectivity. If dual connectivity is to be established for the UE, the primary base station can only be a LTE base station and the secondary base station is a 5G base station that can provide a new access technology (i.e, new RAT) on the air interface. There are several ways for dual connectivity as described in the Background above. A new approach called SCG split bearer is introduced in the 5G. Over this kind of bearer, the 5G base station receives data from the gateway of the core network, and then splits the data into two paths, in one path the data is transmitted to the LTE base station through the X2 interface and then transmitted to the UE by the LTE base station, and in the other path the data is transmitted to the UE through the 5G base station. FIG. 8 illustrates how to establish a SCG split bearer in such architecture.

Through the method in the embodiment, the secondary base station can obtain correct configuration parameters of the bearer, and can configure and schedule the UE according to the parameters. At the same time, the primary base station can share the traffic over the bearer established on the secondary base station according to the decision made by the secondary base station, so as to ensure that the total traffic between the secondary base station and the primary base station does not exceed the UE capabilities, and can satisfy the quality requirement of the bearer. The embodiment comprises the following steps:

Step 1301: the primary base station (a LTE base station) sends a secondary base station addition request message to the secondary base station (a 5G base station).

The primary base station determines to establish a bearer on the secondary base station. This bearer may a bearer previously established on the source secondary base station or on the primary base station, or is a new bearer configured by the MME. The secondary base station addition request message includes an identifier of the bearer, a receiving IP address and tunnel number TEID of the bearer in the gateway of the core network. The secondary base station addition request message further carries information of capabilities of the UE. The capabilities of the UE may include two types: (1) the capabilities of the UE in the 5G access network, which are not applicable in the LTE access network; and (2) the common capabilities of the UE in the LTE and 5G access networks, which are applicable in both LTE and 5G. The secondary base station addition request message further carries the type of the connection determined by the LTE base station. The type of the dual connectivity established on the secondary base station may comprise a split bearer, a SCG bearer or a SCG split bearer. In an embodiment of the present disclosure, the type of the dual connectivity is a SCG split bearer. For the SCG split bearer, the primary base station may also share part of data transmission. The LTE base station may pre-allocate a downlink data receiving address, including an IP address and a tunnel number, to receive data from the 5G base station.

The secondary base station addition request message further carries information about quality of service (QoS) to be established on the 5G base station and an aggregation rate (AMBR) of the UE's non-GBR service. The QoS information may contain a QoS class indicator (QCI), a priority (ARP), an uplink/downlink maximum rate of a GBR service, and an uplink/downlink guaranteed rate of a GBR service. For the guaranteed bit rate (GBR) service, the data rate is set mainly by the maximum rate and the guaranteed rate in the QoS information. For the non-guaranteed bit rate (non-GBR) services, the data rate is set mainly by the AMBR. The QoS information and the UE's AMBR are both transmitted by the core network to the primary base station. When establishing dual connectivity, the primary base station needs to set the QoS parameter to an appropriate value, which may be different from the value transmitted by the core network. For the SCG split bearer, the QoS information carried in the message, i.e. carried in the message determined by the primary base station, may be set by one of the following methods:

1) The QoS information includes two QoS parameters: (1) a QoS parameter of the bearer, which is the full quality requirement parameter received from the core network during the bearer establishment; (2) a QoS parameter that is to be admitted by the secondary base station or QoS parameter that the primary base station can admit. The primary base station determines, according to its own state, that for example, the primary base station can share part of data, which has its corresponding quality requirement, i.e., corresponds to a set of quality requirement parameters. According to the total quality requirement and the quality requirement that the primary base station can share, the primary base station may determine the quality requirements that the secondary base station needs to bear. Specially, it can be mainly reflected by the GBR maximum rate and guaranteed rate. Because QCIs on the primary base station and the secondary base station are same for a bearer, ARP cannot be changed arbitrarily, but the primary base station can determine the maximum rate and guaranteed rate of the GBR bearer shared by itself, so as to determine the maximum rate and guaranteed rate of the GBR bearer that the secondary base station can share. The sum of the maximum rates of the bearer shared by the primary base station and the secondary base station does not exceed the total maximum rate, and the sum of the guaranteed rate of the bearer shared by the primary base station and the secondary base station does not exceed the total guaranteed rate. For example, if the maximum uplink/downlink rates in the total quality requirement parameters are each set to 100 and the uplink/downlink guaranteed rates in the total quality requirement parameters are each set to 50, and the maximum uplink/downlink rates that the primary base station can share are set to 80 and the uplink/downlink guaranteed rates that the primary base station can share are each set to 20, then in the quality requirement parameters to be shared by the secondary base station, the maximum uplink/downlink rates are 20 and the uplink/downlink guaranteed rates are 30.

2) The QoS information is the quality requirement parameter of the bearer. The quality requirement parameter of the bearer may be a quality requirement parameter received from the core network during the bearer establishment.

The secondary base station determines configuration information of the bearer on the UE according to the QoS requirement of the bearer and the UE capabilities. According to different quality requirement parameters of the bearer transmitted by the primary base station, the secondary base station has corresponding operations:

1) If two QoS parameters are received, one being the full QoS parameter of the bearer, and the other being the QoS parameter that is to be admitted by the secondary base station or QoS parameter that is admittable by the primary base station. The secondary base station determines whether the QoS parameter can be provided by the secondary base stations according to its own status, such as the memory status, the quality of the air interface, and other information. If the secondary base station determines to share a part of data for the primary base station, the secondary base station may obtain the quality requirement parameter that the primary base station can share by referring to the information transmitted by the primary base station, so that the secondary base station can determine the quality requirement shared by the primary base station.

2) If one QoS parameter (i.e., a quality requirement parameter of the bearer) is received, the secondary base station determines the quality requirement shared by the secondary base stations according to its own status, such as the memory status, the quality of the air interface, and other information. If the secondary base station determines to share a part of data for the primary base station, the secondary base station determines the quality requirement shared by the primary base station, especially the values of the guaranteed rate and the maximum rate of the GBR service that the primary base station should share, so as to ensure the sum of the quality requirements shared by the secondary base station and the primary base station does not exceed the quality requirement parameter of the bearer.

The secondary base station addition request message in step 1301 may further carry the AMBR(s) of the UE. The AMBR(s) in the secondary base station addition request message may be one or more of the following:

1) The AMBR in the message is the aggregation rate of the non-GBR service to be established on the secondary base station which is determined by the primary base station. Considering that some non-GBR services are established on the primary base station, the AMBR may be set to a different value from that of the UE AMBR transmitted by the core network to the primary base station. If all non-GBR services are established on the secondary base station, the AMBR may be set to the same value as that of the UE AMBR transmitted by the core network to the primary base station. If the non-GBR services are established on both the primary base station and the secondary base station simultaneously, the sum of the AMBRs on the primary base station and the secondary base stations does not exceed the total UE AMBR.

2) The secondary base station addition request message may further include an AMBR that the primary base station can take, specifically, a value of the uplink AMBR that the primary base station can take. Because the type of the dual connectivity in this embodiment of the present disclosure is a SCG split bearer, the secondary base station may determine to send data via the secondary base station and the primary base station, and the secondary base station may determine an uplink AMBR split to the primary base station. The primary base station may schedule, according to the uplink AMBR split, the uplink data for the UE, i.e. allocate uplink resources. In the message may contain the AMBR that the primary base station can share, which is a reference for the secondary base station. The AMBR set by the secondary base station to split to the primary base station should not exceed the value.

3) The secondary base station addition request message contains the total AMBR of the UE (UE-AMBR) and the secondary base station AMBR. The UE-AMBR is a UE-AMBR transmitted by the core network to the primary base station, and the secondary base station AMBR is the maximum aggregation rate of the non-GBR service allocated by the primary base station for the secondary base station, wherein the secondary base station performs data shaping and scheduling according to the secondary base station AMBR. Generally, each AMBR comprises both uplink and downlink values. In the secondary base station addition request message in step 1301, the UE-AMBR may include an uplink one and a downlink one, or the UE-AMBR includes only the uplink one. The secondary base station learns the secondary base station AMBR from the secondary base station addition request message. The secondary base station may obtain the primary base station AMBR or at least obtain the primary base station uplink AMBR, according to the relationship of UE-AMBR=the primary base station AMBR+the secondary base station AMBR.

For downlink data, the secondary base station controls the received downlink data according to the DL-AMBR included in the secondary base station AMBR, so that the total rate of non-GBR services on the secondary base station does not exceed the value indicated by the DL-AMBR. For uplink data, data split is performed on the UE side. The secondary base station may configure an uplink split threshold and a priority cell group for the UE. The priority cell group may be an MCG or a SCG. When the uplink data transmitted by the UE is less than a certain threshold, the data may be transmitted through the priority cell group. When the data is greater than the uplink split threshold, the UE may split the uplink data and send the uplink data to the primary base station and the secondary base station through two paths respectively. For uplink data related configuration, the behavior of the secondary base station is as below:

The secondary base station may negotiate with the primary base station a different (e.g., a new) primary base station uplink AMBR than the primary base station uplink AMBR indicated by the primary base station. The secondary base station determines whether the primary base station uplink AMBR needs modification or not and notifies the primary base station of the modified value via the secondary base station addition response message (described in detail below) in step 1302. Because the primary base station uplink AMBR plus the secondary base station uplink AMBR is equal to the uplink UE-AMBR, the secondary base station may calculate the primary base station uplink AMBR when it receives the UE-AMBR and the secondary base station AMBR. If the secondary base station knows the primary base station uplink AMBR, it may determine whether the primary base station uplink AMBR needs modification or not according to the configuration by the secondary base station for the uplink data split. For example, if the secondary base station determines that the priority cell group is MCG, the uplink data split threshold is 200, and the primary base station uplink AMBR is 100, then the secondary base station notifies the primary base station that the new primary base station uplink AMBR is 200 through the secondary base station addition response message in step 1302.

The secondary base station does not negotiate with the primary base station, but configures the uplink data split according to the configuration from the primary base station. When configuring the uplink data split, the secondary base station may configure the configuration parameters for the uplink data split on the UE side by referring to the primary base station uplink AMBR and the secondary base station uplink AMBR. For example, if the secondary base station configures MCG as the priority cell group, the uplink split threshold cannot exceed the primary base station uplink AMBR.

4) The secondary base station addition request message includes the total AMBR (UE-AMBR) of the UE and the primary base station AMBR. This example is a variation of above Example 3). The secondary base station may calculate the secondary base station AMBR according to the UE-AMBR and the primary base station AMBR. As described in Example 3), the secondary base station may suggest a new primary base station uplink AMBR, or the secondary base station may determine the configuration parameters for the uplink data split with reference to the primary base station uplink AMBR and the secondary base station uplink AMBR. The behaviors of respective base stations are as those described in the above Example 3), which are omitted here.

5) The secondary base station addition request message includes the secondary base station AMBR and the primary base station AMBR (at least the uplink AMBRs). This example is a variation of the above Example 3). The secondary base station may calculate the UE-AMBR according to the secondary base station AMBR and the primary base station AMBR. As described in Example 3), the secondary base station may suggest a new primary base station uplink AMBR, or the secondary base station may determine the configuration parameters for the uplink data split with reference to the primary base station uplink AMBR and the secondary base station uplink AMBR. The behaviors of respective base stations are as those described in the above Example 3), which are omitted here.

6) The secondary base station addition request message includes the secondary base station AMBR and the uplink AMBR of the SCG split bearer on the primary base station branch. In this example, the primary base station further determines the uplink AMBR of the SCG split bearer on the primary base station branch, and the secondary base station addition request message in step 1301 further includes the uplink AMBR of the SCG split bearer on the primary base station branch. Alternatively, for example, the primary base station notifies the secondary base station of the maximum uplink threshold of the SCG split bearer on the primary base station. According to the information carried in the secondary base station addition request message in step 1301, the behavior of the secondary base station may be as follows:

If the secondary base station addition request message in step 1301 includes the secondary base station AMBR and the uplink AMBR of the SCG split bearer on the primary base station branch, when the secondary base station configures the uplink data split on the UE side, the uplink split threshold cannot exceed the uplink AMBR of the SCG split bearer on the primary base station branch if the priority cell group is the primary base station.

If the secondary base station addition request message in step 1301 includes the maximum uplink threshold of the SCG split bear on the primary base station, when the secondary base station configures the uplink data split on the UE side, the uplink split threshold cannot exceed the maximum uplink threshold of the SCG split bear on the primary base station if the priority cell group is the primary base station.

Step 1302: the primary base station receives the secondary base station addition response message from the secondary base station. The secondary base station addition response message carries the tunnel number of the downlink data receiving IP address of the S1 interface allocated by the secondary base station.

The secondary base station addition response message may also carry the QoS parameter of the SCG split bearer. The quality requirement parameter of the SCG split bearer may be one or more of the following information:

1) The QoS parameter indicates the QoS needed to be provided by the primary base station, corresponding to the data needed to be shared. The primary base station configures, according to the parameter, the user plane (i.e. the RLC layer and the MAC layer) on the primary base station and resources for the corresponding radio connection on the UE, to meet the quality requirement. The secondary base station determines the quality requirement needed to be provided by the primary base station, according to the data to be shared by the primary base station, according to its own situation and with reference to the quality requirement information contained in step 1301. Specially, the quality requirement corresponding to the data needed to be shared by the primary base station may be the maximum uplink/downlink rate and/or the uplink/downlink guaranteed rate to be provided by the primary base station.

2) The QoS parameter is the quality requirement that the secondary base station determines to take according to the data that secondary base station need to share, it is the QoS parameter corresponding to the SCG split bearer accepted by the secondary base station. The primary base station determines the quality requirement corresponding to the data to be shared by the primary base station according to the quality requirement parameter of the bearer transmitted in step 1301 and the quality requirement corresponding to the data to be shared by the secondary base station included in the secondary base station addition response message in this step, and configures the user plane according to this quality requirement. Specially, the QoS parameter determined by the primary base station includes the maximum uplink/downlink rates and the uplink/downlink guaranteed rates to be shared. For example, in the secondary base station addition request message in step 1301, the maximum uplink/downlink rates of the bearer are 100, the uplink/downlink guaranteed rates are 50, the maximum uplink/downlink rates that the secondary base station determines to share are 80, the uplink/downlink guaranteed rate that the secondary base station determines to share are 30. Then the primary base station knows that it needs to share maximum uplink/downlink rates of 20 and uplink/downlink rates of 20. The primary base station configures the user plane (i.e., the RLC layer and the MAC layer) on the primary base station according to the quality requirement, and configures the resources for the corresponding radio connection on the UE.

The secondary base station addition response message may further carry the aggregation rate, AMBR, of the non-GBR service, and the aggregation rate, AMBR, of the non-GBR services may be one or more of the following information:

1) The AMBR is an aggregation rate corresponding to the non-GBR service data to be shared by the primary base station, and the primary base station configures the uplink scheduling resources according to the AMBR. For example, when the uplink AMBR is included, the primary base station may schedule the uplink data of the UE (i.e., determine how many uplink resources to allocate) according to the split uplink AMBR. For the SCG split bearer, the secondary base station may determine to make the primary base send some data. When establishing dual connectivity, the primary base station configures the AMBR on the secondary base station. If the service type is a non-GBR service, the secondary base station may determine the AMBR to be shared by the primary base station. Therefore, the AMBR to be shared by the primary base station, for example, the uplink AMBR shared by the primary base station, may be included in the response message (i.e. the secondary base station addition response message). The primary base station receives a part of uplink data from the UE, and after the primary base station knows the AMBR, the primary base station may schedule the UE according to the AMBR. The primary base station mainly controls the scheduling of the uplink data, and the downlink data is mainly controlled by the secondary base station. Therefore, if the AMBR to be shared by the primary base station carried in the message includes the uplink AMBR and the downlink AMBR, the primary base station can ignore the downlink AMBR and schedule the UE according to the uplink AMBR.

2) The AMBR is an aggregation rate corresponding to the data to be shared by the secondary base station. When establishing dual connectivity, in step 1301, the primary base station configures the AMBR on the secondary base station. The secondary base station may determine, according to its own situation, the AMBR on the secondary base station, i.e., the accepted AMBR, which may of a value same as or different from the value configured by the primary base station. The primary base station notifies the primary base station of the value. The primary base station determines the aggregate rate to be shared by the primary base station according to the AMBR that the secondary base station determines to share in combination with the AMBR preconfigured by the primary base station to be shared by the secondary base station, and configures the uplink scheduling resources according to the AMBR to be shared by the primary base station.

The above embodiment relates to the quality of service (QoS) parameter of the SCG split bearer of the secondary base station and the aggregation rate (AMBR) of the non-GBR service of the UE. It should be noted that, in some embodiments, only either one of the above two parameters may be involved.

3) In this example, instead of directly including AMBRs, other parameters related to AMBRs may be included, and the parameters for the uplink scheduling of the primary base station may be set in other forms. For example, the secondary base station addition response message in step 1302 may carry the uplink data split threshold and/or the priority cell group indication. The uplink data split threshold is allocated by the secondary base station for the UE, and the primary base station may schedule the uplink data with reference to the uplink data split threshold. For example, when the priority cell group indication information indicates that the priority cell group is a MCG, the MCG schedules the UE with reference to the threshold.

If the secondary base station addition response message in step 1302 includes a primary base station AMBR (e.g., at least an uplink AMBR) or a secondary base station AMBR (e.g., at least an uplink AMBR), the primary base station may calculate a new primary base station uplink AMBR. This means that the primary base station may modify the primary base station uplink AMBR according to the indication from the secondary base station, that is, the primary base station may schedule the UE using an uplink AMBR negotiated with the secondary base station. In the downlink, the secondary base station controls the downlink data received by the secondary base station according to the configuration from the primary base station without negotiation with the primary base station. The reason that the uplink AMBR needs to negotiate is that the secondary base station determines the uplink data split threshold and the priority cell group. When the primary base station performs the UE-AMBR split, it does not know the configuration parameters made by the secondary base station for the uplink data split. The primary base station AMBR determined by the primary base station may conflict with the secondary base station AMBR. For example, the UE-AMBR carried in the secondary base station addition request message in step 1301 is 200, the secondary base station uplink AMBR is 150, the secondary base station intends to configure the primary cell group as the priority cell group, and the split threshold is 100, then the secondary base station needs to reduce the secondary base station uplink AMBR and increase the primary base station uplink AMBR. For example, in the case that the secondary base station uplink AMBR is set to 90, the secondary base station addition response message in step 1302 may indicate that the primary base station uplink AMBR is 110, or may indicate that the secondary base station AMBR is 90, and the primary base station may calculate a new primary base station uplink AMBR of 110.

If the secondary base station addition response message in step 1302 does not include AMBRs, it means that the secondary base station should accept the configuration made by the primary base station. In the downlink, the secondary base station controls the downlink data received by the secondary base station according to the secondary base station AMBR configured by the primary base station. In the uplink, the secondary base station performs configurations for scheduling and uplink data split according to the secondary base station AMBR configured by the primary base station and other information included in step 1301. Specially, according to the secondary base station addition request message in step 1301, the secondary base station may learn the secondary base station AMBR, and the secondary base station may also know or calculate the primary base station uplink AMBR, or may know the Uplink AMBR of the SCG split bear on the primary base station branch, or learn the maximum uplink threshold of the SCG split bear on the primary base station. When configuring the uplink data split, the secondary base station may determine the uplink data split threshold and the priority cell group by referring to any one or more items of the foregoing information. For example, if the secondary base station addition request message indicates that the UE-AMBR is 200 and the secondary base station uplink AMBR is 150, then the secondary base station may calculate that the primary base station uplink AMBR is 50, and the threshold cannot exceed 50 if the secondary base station configures the primary base station as the priority cell group.

Step 1303: the primary base station sends an RRC reconfiguration request message to the UE. The RRC reconfiguration request message may include configuration parameters for the radio resources of the UE made by the primary base station and the secondary base station.

Step 1304: the primary base station receives an RRC reconfiguration complete message from the UE. After performing radio resource configuration, the UE sends a response message (an RRC reconfiguration complete message) to the base station.

The RRC reconfiguration request message in step 1303 may be transmitted by the primary base station to the UE, or may be transmitted by the primary base station and the secondary base station to the UE respectively. The UE may send the response message (the RRC reconfiguration complete message) to the primary base station and the secondary base station respectively.

Step 1305: the primary base station sends a path switch request message to the MME.

If necessary, the UE perform a random access procedure with a secondary base station, to synchronize with the secondary base station. After the random access process is completed, if necessary, the new secondary base station may notify the primary base station that the random result is success.

The primary base station may send a path switch request message to the MME, where the path switch request message may include a bearer and its corresponding downlink receiving IP address and TEID. In this embodiment, the downlink receiving IP address and TEID corresponding to the bearer may be allocated by the secondary base station, and may be transmitted to the primary base station in step 1302. The path switch request message may be transmitted by the MME to the SGW.

Step 1306: the primary base station receives a path switch response message from the MME. The path switch response message includes the uplink IP address and TEID allocated by the SGW.

Step 1307: if the SGW allocates a new uplink IP address and TEID, the primary base station sends a configuration update message to the secondary base station, to update the uplink IP address and TEID of the bearer. If the SGW adopts the old IP address and TEID, i.e., the same IP address and TEID as received in step 1301, it is not necessary to perform step S1307.

If the core network has been upgraded to a 5G core network, the LTE base station may be connected to the 5G core network, which may be referred to as an eLTE base station in the present disclosure. The eLTE base station may send data to the UE through dual connectivity together with the 5G base station. The primary base station/secondary base station may be an eLTE base station or a 5G base station. There are several approaches for the dual connectivity, as described in the foregoing Background. A new approach called SCG split bearer is introduced in the 5G. Over this kind of bearer, the secondary base station receives data from the core network, and then splits the data into two paths, in one path the data is transmitted to the eLTE base station through the Xn interface and then transmitted to the UE by the eLTE base station, and in the other path the data is transmitted to the UE through the 5G base station. The PDCP layer of the data radio bearer is on the secondary base station. The secondary base station processes the data in PDCP and splits the data into two parts. One part is transmitted from the primary base station to the UE and the other part is transmitted from the secondary base station to the UE.

Figure 14:
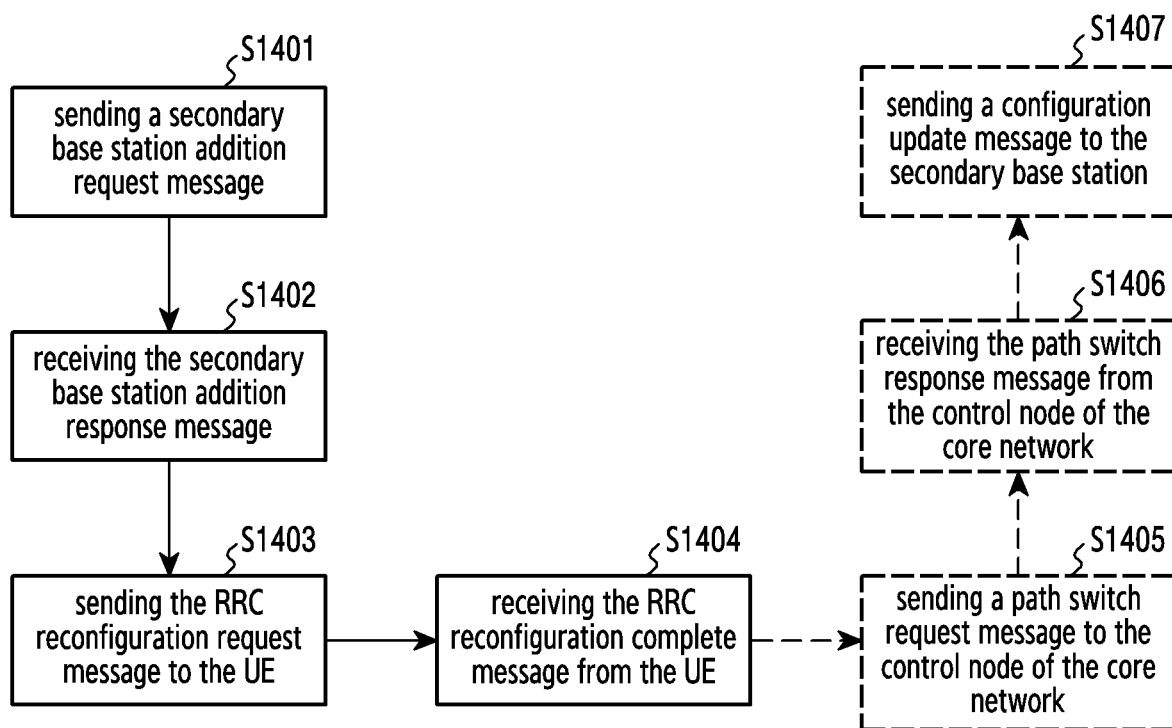
FIG. 14 shows a flowchart of another data transmission method performed by a primary base station according to an embodiment of the present disclosure.

With reference to FIG. 14, it illustrates how to set up an SCG split bearer in this architecture according to an embodiment of the present disclosure.

Step 1401: the primary base station (an eLTE base station) sends a secondary base station addition request message to the secondary base station (a 5G base station).

The primary base station determines that some QoS flows are to be established on the secondary base station. The secondary base station addition request message may include identifiers of the QoS flows, receiving IP addresses and tunnel numbers, TEIDs, in the core network gateway of the PDU sessions corresponding to the QoS flows. The secondary base station addition request message further carries information of capabilities of the UE. The capabilities of the UE may include two types: (1) the capabilities of the UE in the 5G access network, which are not applicable in the LTE access network; and (2) the common capabilities of the UE in the LTE and 5G networks, which are applicable in both LTE and 5G. The secondary base station addition request message may further carry the type of the connection determined by the LTE base station. The type of the dual connectivity established on the secondary base station may comprise a split bearer, a SCG bearer or a SCG split bearer. In an embodiment of the present disclosure, the type of the dual connectivity is a SCG split bearer. For the SCG split bearer, the primary base station may also share part of data transmission. The LTE base station may pre-allocate a downlink data receiving address, including an IP address and a tunnel number, to receive data from the 5G base station.

The secondary base station addition request message may further carry quality of service (QoS) parameters of the QoS flows to be established on the 5G base stations, AMBRs of the non-GBR service in the PDU sessions corresponding to the QoS flows, AMBR of the non-GBR service subscribed by the UE. The QoS parameters of the QoS flows may include quality level indications (CQIs) and priorities (ARPs).

For the non-GBR service, the aggregation rate of the non-GBR data is determined mainly by the PDU session AMBRs and the AMBR subscribed by the UE. If the sum of all of the PDU session AMBRs is greater than the AMBR subscribed by the UE, the actual AMBR is the AMBRs subscribed by the UEs. If the sum of all of the PDU session AMBRs is smaller than the AMBR subscribed by the UE, the actual AMBR is the sum of all of the PDU session AMBRs.

The secondary base station addition request message indicates that the type of dual connectivity to be established is a SCG split bearer. For a SCG split bearer, the QoS parameters of the QoS flows carried in the secondary base station addition request message may be received from the core network. The secondary base station determines the mapping of these QoS flows to a data radio bearer, based on the QoS requirements of the QoS flows and the UE capabilities.

The secondary base station addition request message may further carry the AMBRs of the PDU sessions. The AMBRs of the PDU sessions carried in the secondary base station addition request message may be the AMBRs of the PDU sessions transmitted by the core network, or may be less than the AMBRs of the PDU sessions transmitted by the core network. When all of the PDU sessions are established on the secondary base station, the AMBRs of the PDU sessions carried by the secondary base station addition request message does not exceed the AMBRs of the PDU sessions transmitted by the core network. If some of the QoS flows in a certain PDU Session are established on the primary base station and the other QoS flows are established on the secondary base station, the primary base station may determine the AMBR of the PDU session on the primary base station and the AMBR of the PDU session on the secondary base station. The total AMBR does not exceed the AMBR of the PDU session transmitted by the core network.

The secondary base station addition request message may further carry the authenticated AMBR of the UE. The authenticated AMBR of the UE carried in the secondary base station addition request message may be equal to the authenticated UE-AMBR transmitted by the core network or may be less than the authenticated UE-AMBR transmitted by the core network. If some of the QoS flows are established on the primary base station and the other QoS flows are established on the secondary base station, the primary base station may determine the authenticated UE-AMBRs corresponding to the QoS flows on the primary base station and the QoS flows on the secondary base station. The sum of the authenticated UE-AMBRs of the primary and secondary base stations does not exceed the authenticated UE-AMBR transmitted by the core network.

Specially:

1) The secondary base station addition request message includes the total authenticated AMBR of the UE (the authenticated UE-AMBR) and the secondary base station AMBR. The authenticated UE-AMBR is a UE-AMBR transmitted by the core network to the primary base station, and the secondary base station AMBR is a maximum aggregation rate of the non-GBR service allocated by the primary base station to the secondary base station. The secondary base station performs data shaping and scheduling according to the secondary base station AMBR. Generally, the AMBR includes both uplink and downlink values. In the secondary base station addition request message in step 1401, the authenticated UE-AMBR may include uplink and downlink values, or the authenticated UE-AMBR may include only the uplink value. The secondary base station learns the secondary base station AMBR from the secondary base station addition request message, and the secondary base station may obtain the primary base station AMBR or at least the primary base station uplink AMBR according to the relationship of the authenticated UE-AMBR=the primary base station AMBR+the secondary base station AMBR.

For downlink data, the secondary base station controls the received downlink data according to the DL-AMBR included in the secondary base station AMBR, so that the total rate of the non-GBR services on the secondary base station does not exceed the value indicated by the DL-AMBR. For uplink data, the data split is performed on the UE side. The secondary base station may configure an uplink split threshold and a priority cell group for the UE. The priority cell group may be an MCG or a SCG. When the uplink data transmitted by the UE are less than a specific threshold, it can be transmitted through the priority cell group. When the data is greater than the uplink split threshold, the UE may split the uplink data and send the data to the primary base station and the secondary base station through two paths respectively. For uplink data related configuration, the behavior of the secondary base station is as below:

The secondary base station may negotiate with the primary base station a different (e.g., a new) primary base station uplink AMBR than the primary base station uplink AMBR indicated by the primary base station. The secondary base station determines whether the primary base station uplink AMBR needs modification or not and notifies the primary base station of the modified value via the secondary base station addition response message (described in detail below) in step 1402. Because the primary base station uplink AMBR plus the secondary base station uplink AMBR is equal to the authenticated uplink UE-AMBR, the secondary base station may calculate the primary base station uplink AMBR upon receiving the UE-AMBR and the secondary base station AMBR. If the secondary base station knows the primary base station uplink AMBR, it may determine whether the primary base station uplink AMBR needs modification or not according to the configuration by the secondary base station for the uplink data split. For example, if the secondary base station determines that the priority cell group is the MCG, the uplink data split threshold is 200, and the primary base station uplink AMBR is 100, then the secondary base station notifies the primary base station that the new primary base station uplink AMBR is 200 through the secondary base station addition response message in step 1402.

The secondary base station does not negotiate with the primary base station, but configures the uplink data split according to the configuration from the primary base station. When configuring the uplink data split, the secondary base station may configure the configuration parameters for the uplink data split on the UE side by referring to the primary base station uplink AMBR and the secondary base station uplink AMBR. For example, if the secondary base station configures MCG as the priority cell group, the uplink split threshold cannot exceed the primary base station uplink AMBR 2) The secondary base station addition request message includes the total authenticated AMBR of the UE (the authenticated UE-AMBR) and the primary base station AMBR. This example is a variation of the above Example 1). Based on the authenticated UE-AMBR and the primary base station AMBR, the secondary base station can calculate the secondary base station AMBR. As described in the above Example 1), the secondary base station may suggest a new primary base station uplink AMBR, or the secondary base station may determine the configuration parameters for the uplink data split with reference to the primary base station uplink AMBR and the secondary base station uplink AMBR. The behaviors of the base stations are as those described in the above Example 1), which are omitted here.

3) The secondary base station addition request message includes the secondary base station AMBR and the primary base station AMBR (at least the uplink AMBRs). This example is a variation of the above Example 1). The secondary base station may calculate the authenticated UE-AMBR according to the secondary base station AMBR and the primary base station AMBR. As described in Example 1), the secondary base station may suggest a new primary base station uplink AMBR, or the secondary base station may determine the configuration parameters for the uplink data split with reference to the primary base station uplink AMBR and the secondary base station uplink AMBR. The behaviors of respective base stations are as those described in the above Example 1), which are omitted here.

4) The secondary base station addition request message includes the secondary base station AMBR and the uplink AMBR of the SCG split bearer on the primary base station branch. In this example, the primary base station further determines the uplink AMBR of the SCG split bearer on the primary base station branch, and the secondary base station addition request message in step 1401 further includes the uplink AMBR of the SCG split bearer on the primary base station branch. Alternatively, for example, the primary base station notifies the secondary base station of the maximum uplink threshold of the SCG split bearer on the primary base station. According to the information carried in the secondary base station addition request message in step 1401, the behavior of the secondary base station may be as follows:

If the secondary base station addition request message in step 1401 includes the secondary base station AMBR and the uplink AMBR of the SCG split bearer on the primary base station branch, when the secondary base station configures the uplink data split on the UE side, the uplink split threshold cannot exceed the uplink AMBR of the SCG split bearer on the primary base station branch if the priority cell group is the primary base station.

If the secondary base station addition request message in step 1401 includes the maximum uplink threshold of the SCG split bear on the primary base station, when the secondary base station configures the uplink data split on the UE side, the uplink split threshold cannot exceed the maximum uplink threshold of the SCG split bear on the primary base station if the priority cell group is the primary base station.

Step 1402: the primary base station receives the secondary base station addition response message from the secondary base station. The secondary base station addition response message carries SCG bear configuration information for the UE. The SCG bear configuration information carries the tunnel number of the downlink data receiving IP address of the NG interface allocated by the secondary base station, an identifier of a corresponding QoS flow, and an identifier of a PDU session to which the QoS flow belongs.

The secondary base station addition response message may further carry the quality requirement parameters of the SCG split bearer. The quality requirement parameters of the SCG split bearer may be one or more of the following:

1) The quality requirement parameter is the quality requirement corresponding to the data to be shared by the primary base station. The primary base station configures the user plane (i.e. the RLC layer and the MAC layer) on the primary base station according to the parameter and configures resources for the corresponding radio connection on the UE, to meet the quality requirement.

2) The quality requirement parameter is the quality requirement corresponding to the data that the secondary base station determines to share. The primary base station determines the quality requirement corresponding to the data to be shared by the primary base station according to the quality requirement parameter of the QoS flow transmitted in step 1401 and the quality requirement corresponding to the data that the secondary base station determines to share which is included in the secondary base station addition response message in this step, and configures the user plane based on this quality requirement.

The secondary base station addition response message may also carry an aggregation rate (AMBR) of a certain PDU Session. The aggregation rate (AMBR) may be one or more of the following information:

1) The AMBR is an aggregation rate corresponding to the non-GBR service data transmitted on the SCG split bearer to be shared by the primary base station, and the primary base station configures uplink scheduling resources according to the AMBR. For example, when the uplink AMBR is included, the primary base station may schedule the uplink data of the UE (i.e., determine how many uplink resources to allocate) according to the split uplink AMBR. Specially, if some of the QoS flows contained in a certain session are established on the primary base station and the other QoS flows are established on the secondary base station, the primary base station may determine the PDU Session AMBRs to be shared by the primary and secondary base stations when establishing the SCG split bear. The sum of the PDU Session AMBR on the primary base station (called AMBR-1) and the PDU Session AMBR on the secondary base station (called AMBR-2) does not exceed the PDU Session AMBR transmitted by the core network (called AMBR-0). The primary base station and the secondary base station schedule the UE and shape the entire data of the session according to the PDU Session AMBRs, so that the data volume of the PDU session transmitted to the core network does not exceed the value indicated by the PDU Session AMBR. For the SCG split bearer, the secondary base station determines to make the primary base station send some data. The secondary base station may determine a PDU Session AMBR to be shared by the primary base station (called AMBR-3), and the PDU Session AMBR to be shared by the primary base station is less than or equal to the PDU Session AMBR determined by the primary base station to be shared by the secondary base station (i.e. AMBR-3 is less than or equal to AMBR-2). Therefore, the PDU Session AMBR to be shared by the primary base station (i.e., AMBR-3) may be included in the response message (i.e. the secondary base station addition response message), and in fact the PDU Session AMBR to be shared by the primary base station is determined from AMBR-3 and AMBR-1.

2) The AMBR is an aggregation rate corresponding to the data to be shared by the secondary base station. When establishing dual connectivity, in step 1401, the primary base station may configure a PDU Session AMBR on the secondary base station (called AMBR-2). The secondary base station determines, according to its own situation, an AMBR on the secondary base station, i.e., an accepted AMBR (called AMBR-3), which may be of a value same as or different from the value configured by the primary base station. This value may be informed to the primary base station. The primary base station determines the aggregate rate actually to be shared by the primary base station according to the AMBR that the secondary base station determines to share (i.e., AMBR-3) in combination with and the AMBR pre-configured by the primary base station to be shared by the secondary base station (i.e., AMBR-2), and configures the uplink scheduling resources according to the AMBR to be shared by the primary base station.

The secondary base station addition response message may further carry an aggregation rate of the UE (UE-AMBR). The UE-AMBR may be one or more of the following information:

1) The UE-AMBR is a UE-AMBR corresponding to the non-GBR service data transmitted on the SCG split bearer to be shared by the primary base station, and the primary base station configures an uplink scheduling resources according to the UE-AMBR. For example, when the uplink AMBR is included, the primary base station may schedule the uplink data of the UE (i.e., determine how many uplink resources to allocate) according to the split uplink AMBR. Specially, if some of the QoS flows contained in a certain session are established on the primary base station and the other QoS flows are established on the secondary base station, the primary base station may determine the UE-AMBRs to be shared by the primary and secondary base stations when establishing the SCG split bear. The sum of the UE-AMBR on the primary base station (called AMBR-1) and the UE-AMBR on the secondary base station (called AMBR-2) does not exceed the UE-AMBR transmitted by the core network (called AMBR-0). The primary base station and the secondary base station schedule the UE and shape the entire non-GBR service data of the UE according to the UE-AMBRs, so that the data volume of the UE transmitted to the core network does not exceed the value indicated by the authenticated UE-AMBR (i.e. AMBR-0). For the SCG split bearer, the secondary base station determines to make the primary base station send some data. The secondary base station may determine a UE-AMBR to be shared by the primary base station (called AMBR-3), and the UE-AMBR to be shared by the primary base station is less than or equal to the UE-AMBR determined by the primary base station to be shared by the secondary base station (i.e. AMBR-3 is less than or equal to AMBR-2). Therefore, the UE-AMBR to be shared by the primary base station (i.e., AMBR-3) may be included in the response message (i.e. the secondary base station addition response message), and in fact the UE-AMBR to be shared by the primary base station is determined from AMBR-3 and AMBR-1.

2) The UE-AMBR is an aggregation rate corresponding to the data to be shared by the secondary base station. When establishing dual connectivity, in step 1401, the primary base station may configure a UE-AMBR on the secondary base station (called AMBR-2). The secondary base station determines, according to its own situation, an UE-AMBR on the secondary base station, i.e., an accepted UE-AMBR (called AMBR-3), which may be of a value same as or different from the value configured by the primary base station. This value may be informed to the primary base station. The primary base station determines the aggregate rate actually to be shared by the primary base station according to the AMBR that the secondary base station determines to share (i.e., AMBR-3) in combination with and the AMBR pre-configured by the primary base station to be shared by the secondary base station (i.e., AMBR-2), and configures the uplink scheduling resources according to the UE-AMBR to be shared by the primary base station.

The above embodiment relates to the quality of service (QoS) parameter of the QoS flow of the secondary base station, the aggregation rate (AMBR) of the non-GBR service in the packet data unit session corresponding to the QoS flow, and the aggregation rate (AMBR) of the non-GBR service subscribed by the UE. It should be noted that, in some embodiments, only any combination of the above three parameters may be involved.

3) In this example, instead of directly including AMBRs, other parameters related to AMBRs may be included, and the parameters for the uplink scheduling of the primary base station may be set in other forms. For example, the secondary base station addition response message in step 1402 may carry the uplink data split threshold and/or the priority cell group indication. The uplink data split threshold is allocated by the secondary base station for the UE, and the primary base station may schedule the uplink data with reference to the uplink data split threshold. For example, when the priority cell group indication information indicates that the priority cell group is a MCG, the MCG schedules the UE with reference to the threshold.

If the secondary base station addition response message in step 1402 includes a primary base station AMBR (e.g., at least an uplink AMBR) or a secondary base station AMBR (e.g., at least an uplink AMBR), the primary base station may calculate a new primary base station uplink AMBR. This means that the primary base station may modify the primary base station uplink AMBR according to the indication from the secondary base station, that is, the primary base station may schedule the UE using an uplink AMBR negotiated with the secondary base station. In the downlink, the secondary base station controls the downlink data received by the secondary base station according to the configuration from the primary base station without negotiation with the primary base station. The reason that the uplink AMBR needs to negotiate is that the secondary base station determines the uplink data split threshold and the priority cell group. When the primary base station performs the authenticated UE-AMBR split, it does not know the configuration parameters made by the secondary base station for the uplink data split. The primary base station AMBR determined by the primary base station may conflict with the secondary base station AMBR. For example, the UE-AMBR carried in the secondary base station addition request message in step 1401 is 200, the secondary base station uplink AMBR is 150, the secondary base station intends to configure the primary cell group as the priority cell group, and the split threshold is 100, then the secondary base station needs to reduce the secondary base station uplink AMBR and increase the primary base station uplink AMBR. For example, in the case that the secondary base station uplink AMBR is set to 90, the secondary base station addition response message in step 1402 may indicate that the primary base station uplink AMBR is 110, or may indicate that the secondary base station AMBR is 90, and the primary base station may calculate a new primary base station uplink AMBR of 110.

If the secondary base station addition response message in step 1402 does not include AMBRs, it means that the secondary base station should accept the configuration made by the primary base station. In the downlink, the secondary base station controls the downlink data received by the secondary base station according to the secondary base station AMBR configured by the primary base station. In the uplink, the secondary base station performs configurations for scheduling and uplink data split according to the secondary base station AMBR configured by the primary base station and other information included in step 1401. Specially, according to the secondary base station addition request message in step 1401, the secondary base station may learn the secondary base station AMBR, and the secondary base station may also know or calculate the primary base station uplink AMBR, or may know the Uplink AMBR of the SCG split bear on the primary base station branch, or learn the maximum uplink threshold of the SCG split bear on the primary base station. When configuring the uplink data split, the secondary base station may determine the uplink data split threshold and the priority cell group by referring to any one or more items of the foregoing information. For example, if the secondary base station addition request message indicates that the authenticated UE-AMBR is 200 and the secondary base station uplink AMBR is 150, then the secondary base station may calculate that the primary base station uplink AMBR is 50, and the threshold cannot exceed 50 if the secondary base station configures the primary base station as the priority cell group.

Step 1403: the primary base station sends an RRC reconfiguration request message to the UE. The RRC reconfiguration request message may include configuration parameters for the radio resources of the UE made by the primary base station and the secondary base station.

Step 1404: the primary base station receives an RRC reconfiguration complete message from the UE. After performing radio resource configuration, the UE sends a response message (an RRC reconfiguration complete message) to the base station.

The RRC reconfiguration request message in step 1403 may be transmitted by the primary base station to the UE, or may be transmitted by the primary base station and the secondary base station to the UE respectively. The UE may send the response message (the RRC reconfiguration complete message) to the primary base station and the secondary base station respectively.

Step 1405: the primary base station sends a path switch request message to the control node of the core network.

If necessary, the UE perform a random access procedure with a secondary base station, to synchronize with the secondary base station. After the random access process is completed, if necessary, the new secondary base station may notify the primary base station that the random result is success.

The primary base station may send a path switch request message to the control node of the core network, where the path switch request message may include a bearer and its corresponding downlink receiving IP address and TEID. In this embodiment, the downlink receiving IP address and TEID corresponding to the bearer may be allocated by the secondary base station, and may be transmitted to the primary base station in step 1402. The path switch request message may be transmitted by the control node of the core network to the user plane node of the core network.

Step 1406: the primary base station receives a path switch response message from the control node of the core network. The path switch response message includes the uplink IP address and TEID allocated by the user plane node of the core network.

Step 1407: if the user plane node of the core network allocates a new uplink IP address and TEID, the primary base station sends a configuration update message to the secondary base station, to update the uplink IP address and TEID of the bearer. If the user plane node of the core network adopts the old IP address and TEID, i.e., the same IP address and TEID as received in step 1401, it is not necessary to perform step S1407.

Figure 5:
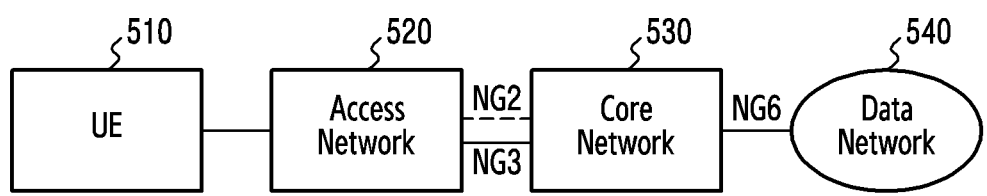
FIG. 5 shows a block diagram of an architecture of a 5G system.

In the architecture of FIG. 5, the core network includes control plane node and user plane node, which may be different entities. NG interface is located between 5G core network and 5G base station. NG interface includes control plane and user plane. The control plane is the interface between the core network control node and the base station, and the user plane interface is the interface between the core network user node and the base station. The base station connected with the 5G core network may be a 5G base station gNB. The interface between two gNBs is the Xn interface, where the Xn interface includes the user plane interface and the control plane interface.

The UE can simultaneously transmit and receive data with two base stations, which is referred to as dual-connectivity. One of the base stations is responsible for transmitting the radio resource control (RRC) message to the UE and interacting with the core network control plane entity. The base stations is referred to as the primary base station MeNB, and the other base station is called the secondary base station SeNB. One cell of the primary base station is the primary cell (Pcell) of the UE, and the primary base station sends the RRC message to the UE through the primary cell, and the other cells are secondary cells (Scells). One cell in the Scells of the secondary base station is the primary cell of the secondary base station (pScell) (the function of pScell). There is an uplink physical layer control channel at pScell, while none at other Scells. The group of cells of the primary base station is MCG, and the group of cells of the secondary base station is SCG. In dual connectivity, there are three types of data bearer, one is split bearer, the second one is SCG bearer, and the third one is SCG split bearer. The convergence protocol PDCP protocol stack of the split bearer is located in the primary base station, and other user plane protocol layers (such as Radio Link Control RLC/Media Access Control MAC/physical layer) are located in the secondary base station. In SCG bearer, all the user plane protocol stacks are located in the secondary base station and include the PDCP/RLC/MAC/physical layer. The secondary base station receives data from the core network and retransmits it to the UE through the air interface after processed by the user plane. SCG split bearer is established in the secondary base station, and the secondary base station may split a part of data to the primary base station.

In 5G, there are some technologies that are different from 4G. For example, 5G defines a new mode in terms of the architecture of Quality of Service (QoS). In the establishment of the PDU Session, the core network sends the default QoS policy and/or the authenticated QoS policy to the radio access network (RAN) and the user equipment (UE). The data connection is the transmission path between the UE and the core network, and includes the transmission path between the core network and the base station and the radio bearer between the base station and the UE. PDU Session is the connection between the UE and the packet data network. The connection is used to transmit data units. Generally, one PDU Session is established for one service. The types of data unit include IP data, Ethernet data, and non-IP data. When establishing the PDU Session, the core network sends QoS policy to the RAN through the NG interface and sends the QoS policy to the UE through the NAS interface. In QoS policy, in addition to the indication/description information of QoS Flow, specific QoS information is also included. The specific QoS information includes at least one of the followings: A. the target of data delay, B. data error rate, C. the priority of data, D. guaranteed data rate, E. the maximum of data rate, and other information can also be included, such as application layer information. The RAN establishes the default DRB according to the requirements of QoS. In addition, the RAN may also establish other DRBs at the same time. At the user plane, the core network groups the packets into QoS Flow and adds the indication information of QoS to the header of QoS Flow. According to indication information of QoS, the RAN can find the corresponding parameters according to the received QoS policy, and process correspondingly to meet the quality requirements by using the data of the user plane according to the parameters in the QoS policy. The core network sends the packet containing QoS indication information to the RAN. The RAN uses the QoS information therein to map QoS flow into resources and radio bearers of the access network. For example, the RAN determines to map the QoS flow to a certain data bearer DRB or create a new data bearer DRB for the QoS flow. When to establish the new DRB is determined by the RAN, for example, it may be established after the signaling of the core network is received, or after the data of the QoS flow users is received. By extracting the QoS indication information contained in the header of the QoS flow, the RAN may get to know the specific QoS requirement corresponding to the QoS flow by combining the default QoS policy saved by the RAN and/or the pre-authentication QoS policy with the indication information. According to the specific QoS requirement, if the current established DRB is suitable for the data carrying QoS requirement, the QoS flow is transmitted through the DRB; otherwise, the RAN may determine to establish the new DRB and use the new DRB to carry QoS flow.

In the architecture of 5G, with the development of wireless technology, the functional modules located on the same base station are separated. Some of them are getting closer to the user while the others are grouped, virtualized, and are collectively deployed. In other words, the base station may be divided into two parts, one of which is the central control unit (CU for short), and the other one is the distribution unit (DU). The DU is closer to the user, while the CU is far away from the antenna and can enable multiple antenna connections to improve network performance. One CU may be connected to multiple DUs and the functions of the CU can be virtualized. The CU communicates with the DU over the fronthaul connection. Fronthaul connection (backhaul) is the connection between the DU (distribute Unit) and the central unit (central unit) of the base station.

Figure 15:
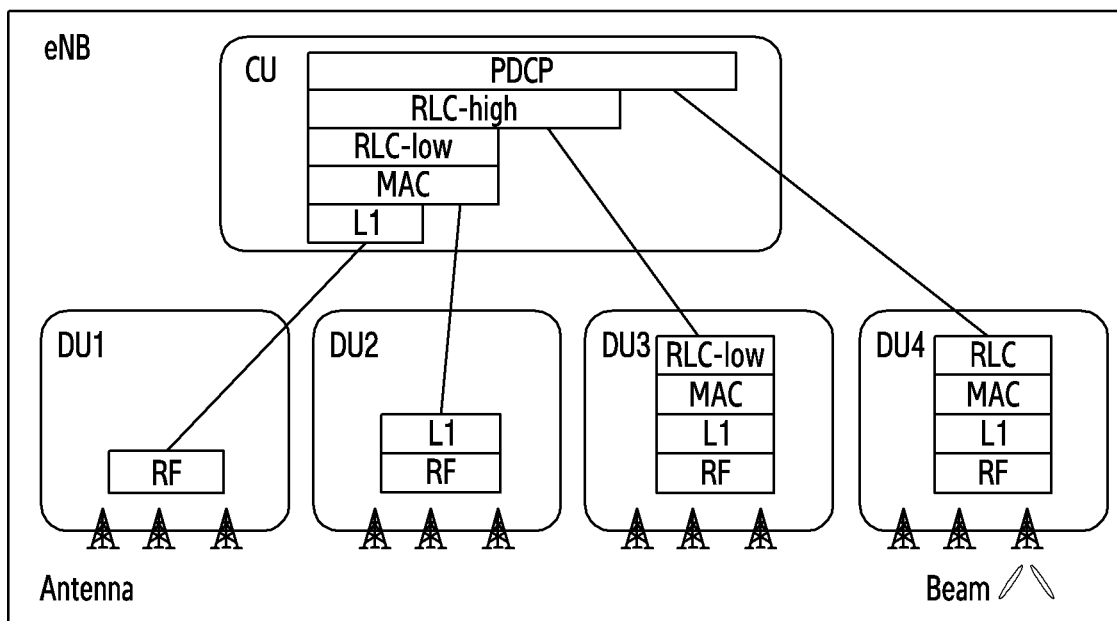
FIG. 15 is the diagram of the system architecture of 5G according to some embodiments of the application.

FIG. 15 is the diagram of the system architecture of 5G, which is based on the architecture of FIG. 5, according to some embodiments of the application. This figure is merely an example and is not intended to limit the scope of the application as claimed.

As shown in FIG. 15, the base station is consist of a CU and a DU. The CU may function as the RRC, RLC, and MAC. The CU and the DU can communicate with each other through the interface therein, which is referred to as the F1 interface in the present application, and there is no interface among the DUs.

Figure 16:
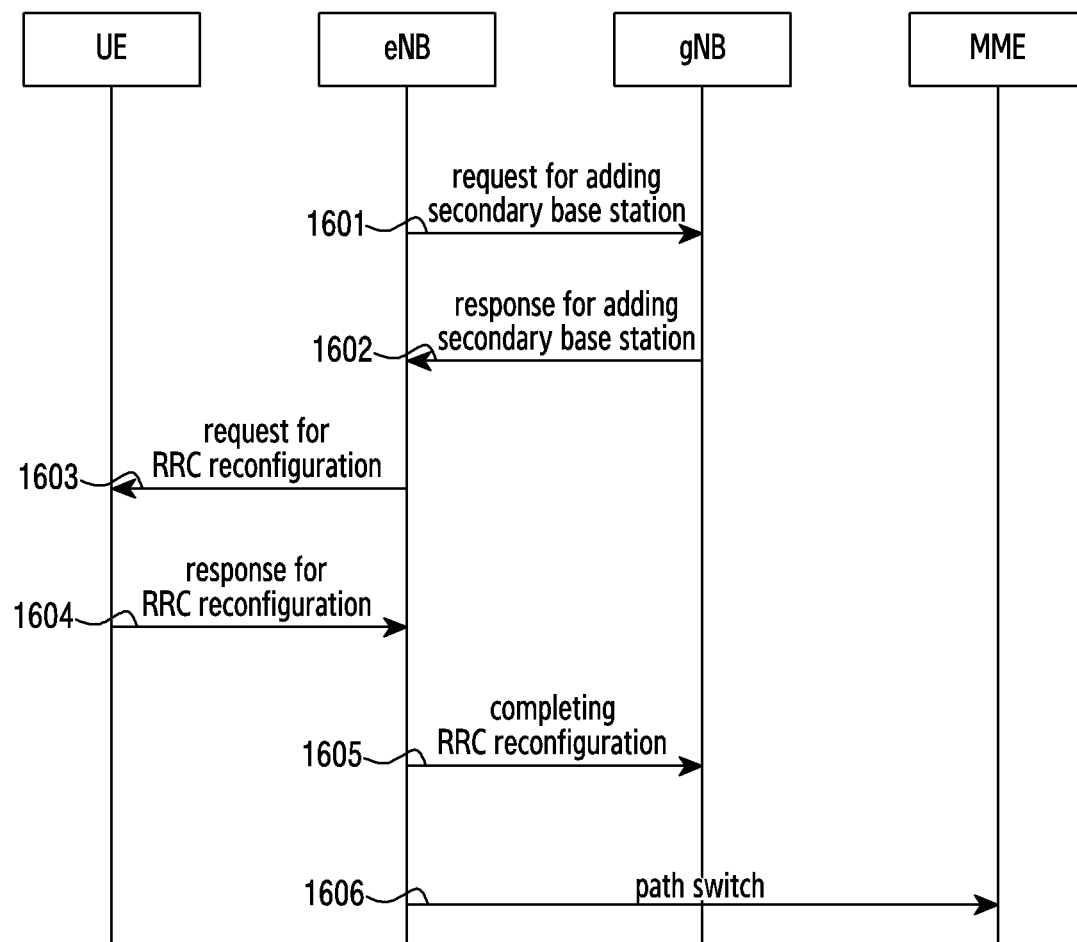
FIG. 16 shows a flowchart of a data transmission method performed by a primary base station according to an embodiment of the present disclosure.

As shown in FIG. 15, there may be various divisions between the functions of the CU and the DU. For example, the CU has the functions of RRC and the user plane PDCP, while the DU has the functions of RLC/MAC and physical layer FIG. 16 shows a flowchart of a data transmission method performed by a primary base station according to an embodiment of the present disclosure.

In the embodiment, the primary base station is an LTE base station and the secondary base station is a 5G new access technology (NR) base station. The LTE base station and the NR base station are connected via X2 interface, and the LTE base station is connected to the core network of the LTE, where the control plane is connected to the MME and the user plane is connected to the SGW. The NR base station connects to the user plane SGW of the core network.

In step 1601, the primary base station sends the request for adding the secondary base station to the target secondary base station.

The primary cell of the UE of the base station receives the measurement report of the user. If the signal quality of some cell of the neighboring secondary base station satisfies the requirement, the primary cell of the primary base station determines to set up a secondary cell of the secondary base station, and the data transmission is executed by the dual connectivity. For example, the base station may determine that one or more DRBs of the MeNB send data through the secondary base station, that is, to establish the split bearer. When the base station where the PCell is located determines to add one cell as SCell, the base station sends the request for adding the secondary base station addition to the base station where the SCell is located.

The primary base station may also determine to send control signaling (that is, the RRC message to be sent to the UE) through the secondary base station. The primary base station duplicates the control signaling. One copy is sent to the UE through the primary base station, and the other one is sent to the UE through the secondary base station. Therefore the transmission reliability is improved.

The primary base station sends the request for adding the secondary base station to the secondary base station, and the message carries one or more of the following information:

(1) The capabilities of the UE, including wireless access capability and encryption capability.

(2) The data bearer information established in the secondary base station, including the type of the data bearer (such as split bearer, SCG bearer or SCG split bearer), the E-RAB identification of the data bearer, and the quality requirements corresponding to the E-RAB. If the type of the data bearer is the split bearer, the information of the data bearer further includes the GTP tunnel ID assigned by the primary base station for receiving the uplink data. If the type of data bearer is SCG bearer or SCG split bearer, the information of the data bearer further includes the GTP tunnel ID assigned by the SGW for receiving the uplink data.

(3) Information of the split signaling. The information of the split signaling includes the identification of the split signaling. The split signaling can be configured in the secondary base station as a new bearer. The identification of the split signaling indicates the type of split the signaling, for example, whether the split signaling is SRB1 or SRB2 is identified. By the identification of the split signaling, the corresponding user plane or control plane can be set up at the X2 interface. Alternatively, the split signaling is configured in the secondary base station according to the way that data bearer is split. The secondary base station processes the split signaling as a kind of split data bearer. The secondary base station does not know whether the split signaling or the data bearer is transmitted on the X2 tunnel. Herein, the identification of the split signaling refers to the identification of E-RAB that uses the data bearer, and the primary base station generates the identification and maintains the correspondence between the E-RAB and the signaling.

(4) QoS requirements corresponding to split signaling. For the data sent by the core network, the Quality of Service (QoS) of data is configured by the server of the authentication policy of the core network, sent to the primary base station over the core network, and then sent to the secondary base station by the primary base station. There are no corresponding QoS requirements for RRC signaling. The primary base station needs to generate QoS requirements corresponding to the RRC signaling by itself. For example, the primary base station determines the corresponding Quality of Service (QoS) requirements according to the type of the split signaling (i.e., SRB1 or SRB2), and makes the secondary base station to establish the corresponding user plane according to the QoS requirements, for example, to establish the RLC/MAC protocol layer. The secondary base station also needs to allocate the transport layer information of the user plane in the X2 interface. For example, for each signaling split bearer (i.e. SCG split bearer), the secondary base station allocates GTP tunnel ID.

(5) The configuration information of split signaling. For the data sent by the core network, the Quality of Service (QoS) of data is configured by the server of the authentication policy of the core network, and QoS is sent to the primary base station over the core network, and then is sent to the secondary base station by the primary base station. For the RRC signaling, the core network does not configure the corresponding QoS requirements. The primary base station determines the corresponding specific configuration information according to the type of the split signaling (i.e., SRB1 or SRB2). The primary base station may send the configuration information of the split signaling, such as RLC configuration information including the uplink RLC configuration, the downlink RLC configuration, the priority, and the logical channel and the like, to the secondary base station. The secondary base station configures the corresponding user plane according to the configuration information, such as establishing RLC/MAC protocol layer.

(6) Indication information. The indication information informs the secondary base station whether the split signaling bearer uses the default configuration, or informs the secondary base station whether the split signaling bearer uses the default configuration information or the explicit configuration. When the UE accesses the primary base station, the primary base station configures signaling bearers for the UE. Specifically, SRB1 and SRB2 may use the default configuration or use the explicit configuration. The default configuration information is defined in the LTE specification. If the default configuration information is used, specific parameters, such as RLC configuration information, do not need to be sent to the UE. The UE also configures the user plane according to the defined value in the specification of LTE radio interface. If the explicit configuration is used, the primary base station needs to configure specific parameters, such as configuration information of the RLC. When the split signaling bearer is configured in the secondary base station, the primary base station needs to tell the secondary base station how the split signaling bearer is configured. The default configuration or the explicit configuration is set by the indication information. If the default configuration is set, the secondary base station uses the defined values in the LTE specification to configure the protocol layer such as RLC, MAC etc. If the explicit configuration is set, the primary base station sends to the secondary base station the specific configuration information of the user plane, such as the configuration information shown in (5). The configuration information shown in (5) may be contained in RRC container, which is the container for sending RRC related information between the primary base station and the secondary base station and contains the configuration information of the RRC configured by the primary base station. The secondary base station may analyze the RRC configuration information contained in the container to obtain the configuration information of SRB1 and/or SRB2. Alternatively, the configuration information shown in (5) is not contained in the RRC container, the configuration information shown in (5) is carried by the information in the message requesting for addition so that the secondary base station does not need to analyze the RRC configuration information contained in the container.

Alternatively, when the secondary base station learns that the split signaling bearer needs to be established, the identification of the split signaling bearer carried in the request for setting secondary base station, such as SRB1 or SRB2, is obtained. By default, the secondary base station uses the default configuration information defined in the LTE specification to configure the user plane, such as using the default RLC configuration parameters defined in the specification of the LTE radio interface to configure the RLC protocol layer. In this way, the split signaling bearer in the secondary base station, such as SRB1, may have different configuration information of the user plane from the bearer configuration information in the primary base station. The configuration of the user plane is not optimal, but has the advantage of reducing signaling transmission between the primary base station and the secondary base station.

In step 1602, the secondary base station sends the response for adding secondary base station to the primary base station.

The secondary base station determines the configuration information of the bearer in the UE according to the QoS and the UE capability of the DRB. As to the target base station, the configuration information of the secondary bearers or the secondary cells in the UE is included in the RRC container, and the container is forwarded to UE via the primary base station. According to the configuration, the UE sets the protocols of each layer of the UE, such as the protocols of the RLC and the MAC layer. The message further carries the identification of the DRB or the identification of the X2 user plane, and the information of the transport layer (for example, the tunnel ID) corresponding to the user plane. The response for adding the secondary base station carries one or more of the following information:

(1) RRC container, which contains the configuration information of the UE by the secondary base station. The RRC protocol in the secondary base station defines the configuration information of the data bearer in the UE. The configuration information of the UE is contained in the RRC container and sent to the UE via the primary base station. The RRC container may further include the configuration information of the split signaling bearer, such as the identification of the split signaling, and its corresponding configuration information of the RLC/MAC. The corresponding configuration information of the RLC/MAC may use the default configuration or the explicit configuration. The default configuration or the explicit configuration has already been described, so it is omitted herein.

(2) The information of the data bearer received by the secondary base station, which includes the identification of the data bearer (E-RAB ID) and GTP tunnel ID allocated by the secondary base station for the data bearer to receive the downlink data;

(3) The information of the split signaling bearer received by the secondary base station includes the identification of the signaling bearer and GTP tunnel ID allocated by the secondary base station for the signaling bearer to receive the downlink signaling data. The message carries the identification for a split signaling bearer successfully established, and/or includes the identification for signaling bearer unsuccessfully established.

In step 1603, the primary base station sends the request for RRC reconfiguration to the UE.

The primary base station does not parse the RRC container and forwards it to the UE. The primary base station may add its own configuration information for the UE therein, and send it to the UE along with the configuration information of the secondary base station.

In step 1604, the UE sends the message for completing the RRC reconfiguration to the primary base station.

After the UE is configured successfully, the response is sent to the primary base station. The response may include the response of the configuration information sent in step 1602, that is, the response to the configuration information of the primary base station, and also include the response to the configuration information of the secondary base station. If necessary, the UE also needs to perform the random access procedure with a new secondary base station and synchronize with the new secondary base station. After synchronization, the secondary base station can start sending data to the UE.

In step 1605, the primary base station sends the message for completing the RRC reconfiguration to the secondary base station.

The primary base station notifies the secondary base station of the information that the UE has been successfully configured. Because the UE sends the acknowledgment to the primary base station, the primary base station needs to forward the acknowledgment to the secondary base station. If the primary base station cannot parse the response to the configuration information of the secondary base station by the UE, the primary base station may also forward the response of the configuration information of the secondary base station by the UE to the secondary base station through the RRC container.

In step 1606, the primary base station sends the path switch message to the core network. The path switch message is not required for some types of the bearer, for example, the split bearer established in the primary base station is not required to send the message. The SCG bearer or SCG split bearer established in the secondary base station is required to send the message. The message carries the GTP tunnel ID assigned by the secondary base station, and is used to receive the downlink data sent by the core network.

At this point, the process of the split signaling bearer and the secondary base station bearer establishment is completed.

Figure 17:
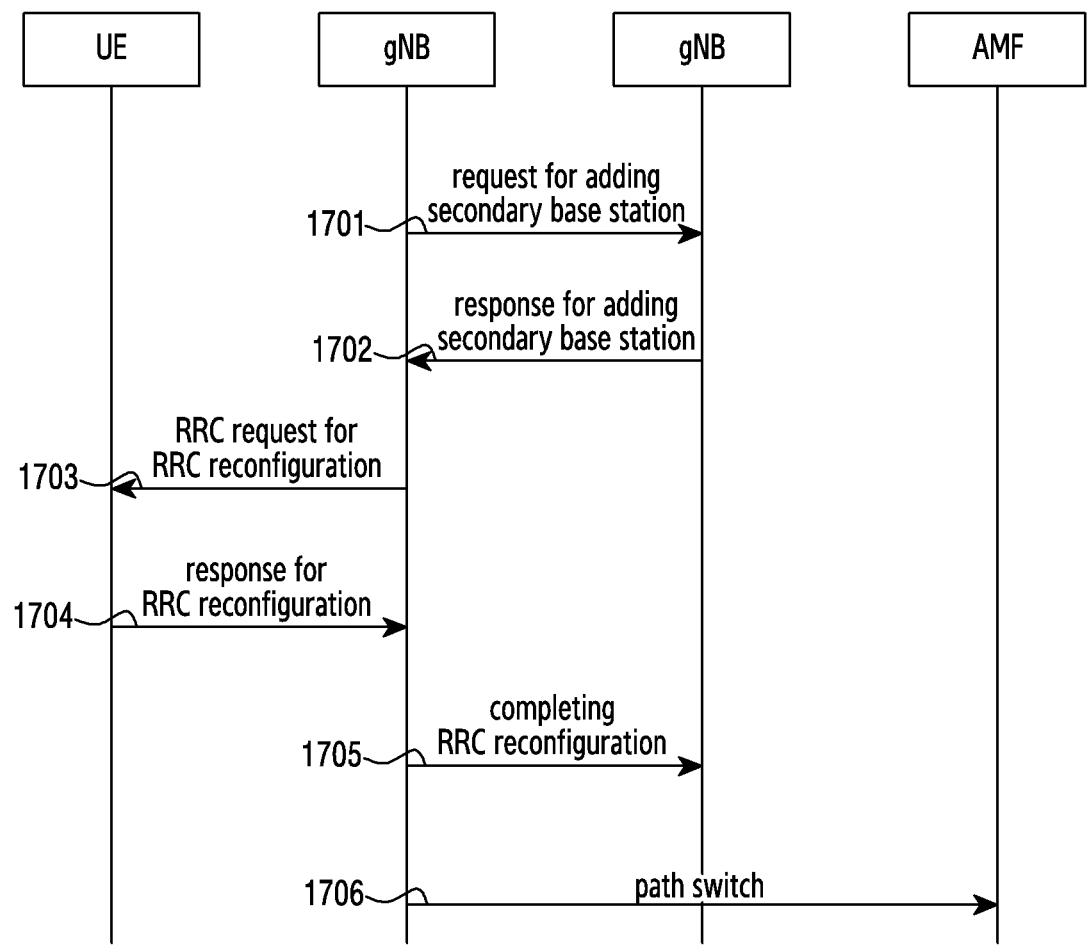
FIG. 17 shows a flowchart of a data transmission method performed by a primary base station according to an embodiment of the present disclosure.

FIG. 17 shows a flowchart of a data transmission method performed by a primary base station according to an embodiment of the present disclosure.

In this embodiment, the primary base station is an LTE base station, and the secondary base stations are 5G new access technology (NR) base stations, or both of the primary base station and the secondary base stations are 5G new access technology (NR) base stations. The interface between base stations is Xn interface, and each base station is connected to the 5G core network. The control plane of the base station is connected to the authentication mobile function entity (AMF), and the user plane of the base station is connected to the user plane function (UPF).

In step 1701, the primary base station sends the request for adding the secondary base station to the target secondary base station.

The primary cell of the UE of the base station receives the measurement report of the user. If the signal quality of some cell of the neighboring secondary base station satisfies the requirement, the primary cell of the primary base station determines to set up a secondary cell of the secondary base station, and the data transmission is executed by the dual connectivity. For example, the base station determines that one or more DRBs of the MeNB send data through the secondary base station, that is, to establish the split bearer. When the base station where the PCell is located determines to add one cell as SCell, the base station sends the request for adding the secondary base station to the base station where the SCell is located.

The primary base station may also determine to send control signaling (that is, the RRC message to be sent to the UE) through the secondary base station. The primary base station duplicates the control signaling. One copy is sent to the UE through the primary base station, and the other one is sent to the UE through the secondary base station. Therefore, the transmission reliability is improved.

The primary base station sends the request for adding the secondary base station to the secondary base station, and the message carries one or more of the following information:

(1) The capabilities of the UE, including wireless access capability and encryption capability.

(2) The information of the data bearer established in the secondary base station includes the type of the data bearer (such as split bearer, SCG bearer or SCG split bearer), the identification of the data bearer in Xn, and the quality requirement of QoS corresponding to the data bearer. The identification of the data bearer may be the DRB identification allocated by the primary base station.

If it is a split bearer, the core network sends the quality requirements of QoS flow to the primary base station, and the quality requirements of QoS flows are different from each other. The primary base station maps the QoS flows with the quality requirements close to the quality requirements sent by the core network to the radio data bearer DRB, and multiple QoS flows with different quality requirements may map to the same DRB. The primary base station determines the QoS requirements corresponding to some DRB mapped to a QoS flow according to the quality requirements corresponding to different QoS flows. For example, for the rate guaranteed (referred to as GRB) service, the strictest quality requirement is selected as the QoS requirement corresponding to the DRB; for Rate non-guaranteed (referred to as non-GRB) services, the loosest quality requirements is selected as the QoS requirements corresponding to the DRB. Alternatively, the information (including QoS flow identification and the corresponding quality requirement) of the QoS flow and the information of the QoS flow mapping to the DRB are sent to the secondary base station, and the secondary base station determines the quality requirements of the DRB.

In the case of SCG bearer or SCG split bearer, the core network sends the quality requirements of QoS flow to the primary base station, wherein the quality requirements of QoS flows are different from each other. The primary base station maps the QoS flows with the quality requirements close to the quality requirements sent by the core network to radio bearer DRB, and multiple QoS flows with different quality requirements can be mapped to the same DRB. When the primary base station needs to establish SCG bearer or SCG split bearer, the primary base station sends the request for adding the secondary base station carrying QoS flow information (QoS flow information includes QoS flow identification and the corresponding quality requirement) to the secondary base station, and the secondary base station determines the map from QoS flow to the DRB and the quality requirements of DRB, and configures the user plane protocol layers according to the quality requirements of the DRB, including the user plane established in the secondary base station and the user plane in the UE, such as PDCP/RLC/MAC. Alternatively, the request for adding the secondary base station carrying the QoS flow information and the information of QoS flow mapping to the DRB is sent to the secondary base station, and the secondary base station determines the quality requirements of the DRB. Alternatively, the primary base station determines QoS requirements corresponding to the DRBs mapping to the QoS Flows according to the quality requirements corresponding to different QoS flows. As described above, the primary base station sends to the secondary base station the request for adding the secondary base station which carries QoS flow information, the information of the QoS flow mapping to the DRB and the quality requirements corresponding to the DRB, and the user plane protocol layer is configured by the secondary base station according to the quality of the DRB, including the user plane established in the secondary base station and the user plane in the UE.

The information of the data bearer also includes the GTP tunnel ID allocated by the primary base station for receiving the uplink data. If the type of the data bearer is SCG bearer or SCG split bearer, the information of the data bearer also includes GTP tunnel ID allocated by the core network SGW for receiving the uplink data.

(3) Information of split signaling. The information of split signaling includes the identification of split signaling. The split signaling can be configured as a new bearer in the secondary base station, for example, it is identified whether the split signaling is SRB1 or SRB2. By the identification of split signaling, its corresponding user plane can be created in the X2 interface. Alternatively, the split signaling is configured in the secondary base station according to the way that the data bearer is split. The secondary base station processes the split signaling as a kind of split data bearer. The secondary base station does not know whether the split signaling or the data bearer is transmitted in the Xn tunnel. Herein, the identification of split signaling refers to the identification that uses data bearer such as DRB identification), and the primary base station generates the identification and saves the correspondence between the DRB identification and the signaling;

(4) QoS requirements corresponding to split signaling. For the data sent by the core network, the Quality of Service (QoS) of data is configured by the server of the authentication policy of the core network, sent to the primary base station over the core network, and then sent to the secondary base station by the primary base station. There are no corresponding QoS requirements for RRC signaling. The primary base station needs to generate QoS requirements corresponding to the RRC signaling by itself. For example, the primary base station determines the corresponding Quality of Service (QoS) requirements according to the type of the split signaling (i.e., SRB1 or SRB2), and makes the secondary base station to establish the corresponding user plane according to the QoS requirements, for example, to establish the RLC/MAC protocol layer. The secondary base station also needs to allocate the transport layer information of the user plane in the Xn interface. For example, for each signaling split bearer (i.e. SCG split bearer), the secondary base station allocates GTP tunnel ID.

(5) The configuration information of split signaling. For the data sent by the core network, the Quality of Service (QoS) of data is configured by the server of the authentication policy of the core network, and QoS is sent to the primary base station over the core network, and then is sent to the secondary base station by the primary base station. For the RRC signaling, the core network does not configure the corresponding QoS requirements. The primary base station determines the corresponding specific configuration information according to the type of the split signaling (i.e., SRB1 or SRB2). The primary base station may send the configuration information of the split signaling, such as RLC configuration information including the uplink RLC configuration, the downlink RLC configuration, the priority, and the logical channel and the like, to the secondary base station. The secondary base station configures the corresponding user plane according to the configuration information, such as establishing RLC/MAC protocol layer.

(6) Indication information. The indication information informs the secondary base station whether the split signaling bearer uses the default configuration or informs the secondary base station whether the split signaling bearer uses the default configuration information or the explicit configuration. When the UE accesses the primary base station, the primary base station configures signaling bearers for the UE. Specifically, SRB1 and SRB2 may use the default configuration or use the explicit configuration. The default configuration information is defined in the LTE specification. If the default configuration information is used, specific parameters, such as RLC configuration information do not need to be sent to the UE. The UE also configures the user plane according to the defined value in the LTE specification. If the explicit configuration is used, the primary base station needs to configure specific parameters, such as configuration information of the RLC. When the split signaling bearer is configured in the secondary base station, the primary base station needs to tell the secondary base station how the split signaling bearer is configured. The default configuration or the explicit configuration is set by the indication information. If the default configuration is set, the secondary base station uses the defined values in the LTE radio interface specification to configure the protocol layer such as RLC, MAC etc. If the explicit configuration is set, the primary base station sends to the secondary base station the configuration information of the user plane, such as the configuration information shown in (5). The configuration information shown in (5) may be contained in RRC container, which is the container for sending RRC related information between the primary base station and the secondary base station, and contains the configuration information of the RRC configured by the primary base station. The secondary base station may analyze the RRC configuration information contained in the container to obtain the configuration information of SRB1 and/or SRB2. Alternatively, the configuration information shown in (5) is not contained in the RRC container, the configuration information shown in (5) is carried by the information in the message requesting for addition so that the secondary base station does not need to analyze the RRC configuration information contained in the container.

Alternatively, when the secondary base station learns that the split signaling bearer needs to be established, the identification of the split signaling bearer carried in the request for setting the secondary base station setup, such as SRB1 or SRB2, is obtained. By default, the secondary base station uses the default configuration information defined in the LTE specification to configure the user plane, such as using the default RLC configuration parameters defined in the specification of the LTE radio interface to configure the RLC protocol layer. In this way, the split signaling bearer in the secondary base station, such as SRB1, may have different configuration information of the user plane from the bearer configuration information in the primary base station. The configuration of the user plane is not optimal, but has the advantage of reducing signaling transmission between the primary base station and the secondary base station.

In step 1702, the secondary base station sends the response for adding the secondary base station to the primary base station.

The secondary base station determines the configuration information of the bearer in the UE according to the QoS and the UE capability of the DRB. As to the target base station, the configuration information of the secondary bearers or the secondary cells in the UE is included in the RRC container, and the container is forwarded to the UE via the primary base station. According to the configuration, the UE sets the protocols of each layer of the UE, such as the protocols of the RLC and the MAC layer. The message further carries the identification of the DRB or the identification of the X2 user plane and the information of the transport layer (for example, the tunnel ID) corresponding to the user plane. The response for adding the secondary base station carries one or more of the following information:

(1) RRC container, which contains the configuration information of the UE by the secondary base station. The RRC protocol in the secondary base station defines the configuration information of the data bearer in the UE. The configuration information of the UE is contained in the RRC container and sent to the UE via the primary base station. The RRC container may further include the configuration information of the split signaling bearer, such as the identification of the split signaling, and its corresponding configuration information of RLC/MAC. The corresponding configuration information of the RLC/MAC may use the default configuration or the explicit configuration. The default configuration or the explicit configuration has been described, so it is omitted herein.

(2) The information of the data bearer received by the secondary base station, which includes the identification of the data bearer (E-RAB ID) and GTP tunnel ID allocated by the secondary base station for the data bearer to receive the downlink data;

(3) The information of the split signaling bearer received by the secondary base station includes the identification of the signaling bearer and GTP tunnel ID allocated by the secondary base station for the signaling bearer to receive the downlink signaling data. The message carries the identification for a split signaling bearer successfully established, and/or includes the identification for signaling bearer unsuccessfully established.

In step 1703, the primary base station sends the request for RRC reconfiguration to the UE.

The primary base station does not parse the RRC container and forwards it to the UE. The primary base station may add its own configuration information for the UE therein, and send it to the UE along with the configuration information of the secondary base station.

In step 1704, the UE sends the message for completing the RRC reconfiguration to the primary base station.

After the UE is configured successfully, the response is sent to the primary base station. The response may include the response of the configuration information sent in step 1202, that is, the response to the configuration information of the primary base station, and also include the response to the configuration information of the secondary base station. If necessary, the UE also needs to perform the random access procedure with a new secondary base station and synchronize with the new secondary base station. After synchronization, the secondary base station can start sending data to the UE.

In step 1705, the primary base station sends the message for completing the RRC reconfiguration to the secondary base station.

The primary base station notifies the secondary base station of the information that the UE has been successfully configured. Because the UE sends the acknowledgment to the primary base station, the primary base station needs to forward the acknowledgment message to the secondary base station. If the primary base station cannot parse the response to the configuration information of the secondary base station by the UE, the primary base station may also forward the response of the configuration information of the secondary base station by the UE to the secondary base station through the RRC container.

In step 1706, the primary base station sends the path switch message to the core network. The path switch message is not required for some types of the bearer, for example, the split bearer established in the primary base station is not required to send the message. The SCG bearer or SCG split bearer established in the secondary base station is required to send the message. The message carries the GTP tunnel ID assigned by the secondary base station, and is used to receive the downlink data sent by the core network.

At this point, the process of the split signaling bearer establishment is completed.

Figure 18:
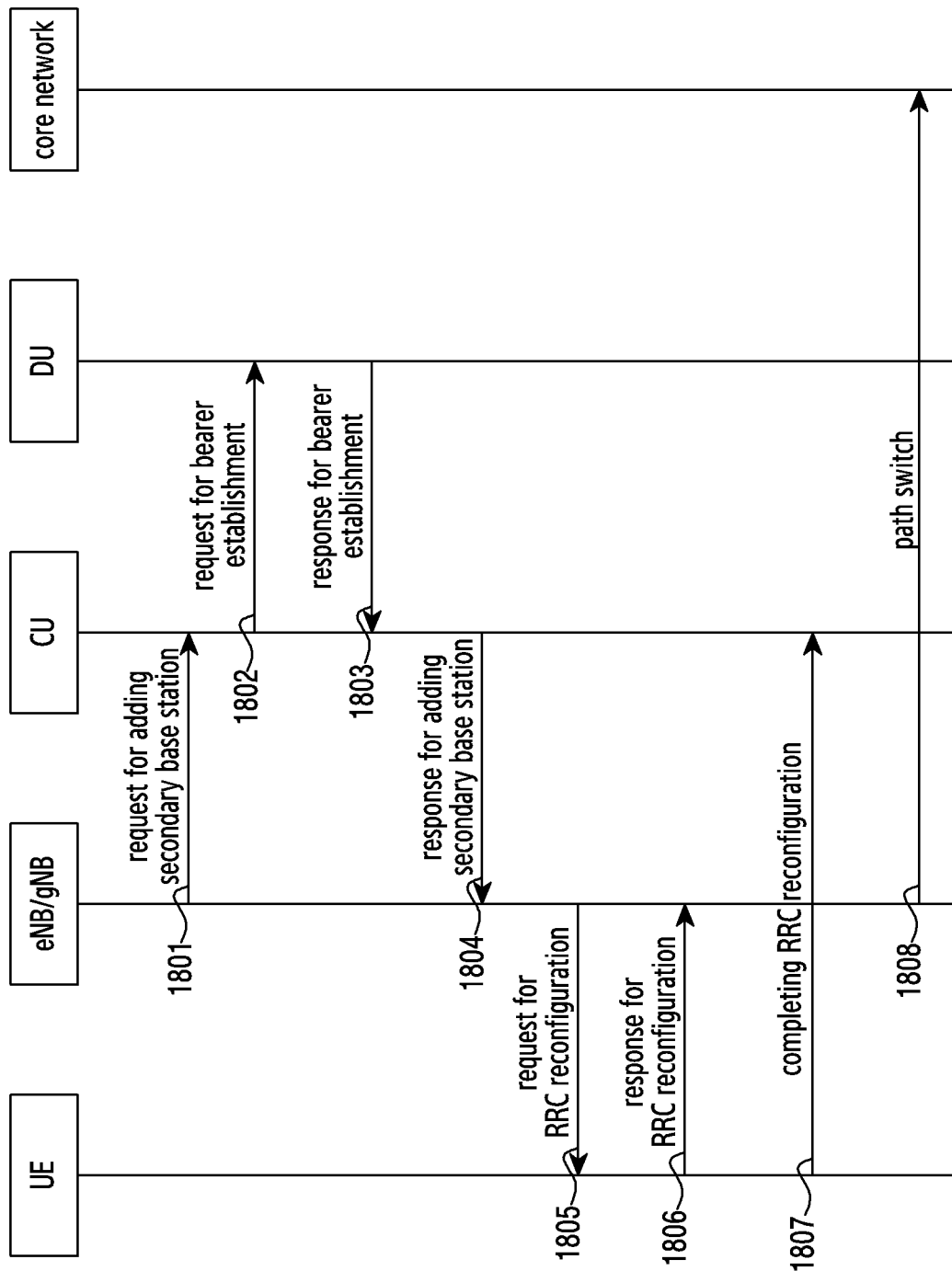
FIG. 18 shows a flowchart of a data transmission method performed by a primary base station according to an embodiment of the present disclosure.

FIG. 18 shows a flowchart of a data transmission method performed by a primary base station according to an embodiment of the present disclosure.

In this embodiment, the primary base station is an LTE base station, and the secondary base stations are 5G new access technology (NR) base stations, or both of the primary base station and the secondary base stations are 5G new access technology (NR) base stations. The interface between base stations is Xn interface, and each base station is connected to the 5G core network. The control plane of the base station is connected to the authentication mobile function entity (AMF), and the user plane of the base station is connected to the user plane function (UPF). The secondary base station gNB is consist of a CU and a DU, and two entities are used to execute the functions of the base station. The CU functions as the RRC protocol layer and the PDCP protocol layer, and the DU functions as the RLC/MAC/physical layer. The interface between the CU and the DU is referred to as the F1 interface.

In step 1801, the primary base station sends the request for adding the secondary base station to the target secondary base station.

The primary cell of the UE on the base station receives the measurement report of the user. If the signal quality of some cell of the neighboring secondary base station satisfies the requirement, the primary cell of the primary base station determines to set up a secondary cell of the secondary base station, and the data transmission is executed by the dual connectivity. For example, the base station determines that one or several DRBs of the MeNB send data through the secondary base station, that is, to establish the split bearer. When the base station where the PCell is located determines to add one cell as SCell, the base station sends the request for adding the secondary base station to the base station where the SCell is located.

The primary base station may also determine to send control signaling (that is, RRC message to be sent to the UE) through the secondary base station. The primary base station duplicates the control signaling. One duplication is sent to the UE through the primary base station, and the other duplication is sent to the UE through the secondary base station. This will improve the reliability of the transmission.

The primary base station sends the request for adding the secondary base station to the secondary base station, and the message carries one or more of the following information:

(1) The capabilities of the UE, including wireless access capability and encryption capability.

(2) The information of the data bearer established in the secondary base station includes the type of the data bearer (such as split bearer, SCG bearer or SCG split bearer), the identification of the data bearer in Xn, and the quality requirement of QoS corresponding to the data bearer. The identification of the data bearer may be the DRB identification allocated by the primary base station.

If it is the split bearer, the core network sends the quality requirements of QoS flow to the primary base station, and the quality requirements of QoS flows are different from each other. The primary base station maps the QoS flows with the quality requirements close to the quality requirements sent by the core network to the radio data bearer DRB, and multiple QoS flows with different quality requirements may map to the same DRB. The primary base station determines the QoS requirements corresponding to some DRB according to the quality requirements corresponding to different QoS flows. For example, for the rate guaranteed (referred to as GRB) service, the strictest quality requirement is selected as the QoS requirement corresponding to the DRB; for Rate non-guaranteed (referred to as non-GRB) services, the loosest quality requirements is selected as the QoS requirements corresponding to the DRB. Alternatively, the information (including QoS flow identification and the corresponding quality requirement) of the QoS flow and the information of the QoS flow mapping to the DRB are sent to the secondary base station, and the secondary base station determines the quality requirements of the DRB.

In the case of SCG bearer or SCG split bearer, the core network sends the quality requirements of QoS flow to the primary base station, wherein the quality requirements of QoS flows are different from each other. The primary base station maps the QoS flows with the quality requirements close to the quality requirements sent by the core network to radio bearer DRB, and multiple QoS flows with different quality requirements can be mapped to the same DRB. When the primary base station needs to establish SCG bearer or SCG split bearer, the primary base station sends request for adding the secondary base station carrying QoS flow information (QoS flow information includes QoS flow identification and the corresponding quality requirement) to the secondary base station, and the secondary base station determines the map from QoS flow to the DRB, and the quality requirements of DRB, and configures the user plane protocol layers according to the quality requirements of the DRB, including the user plane established in the secondary base station and the user plane in the UE, such as PDCP/RLC/MAC. Alternatively, the request for adding the secondary base station carrying the QoS flow information and the information of QoS flow mapping to the DRB is sent to the secondary base station, and the secondary base station determines the quality requirements of the DRB. Alternatively, the primary base station determines QoS requirements corresponding to the DRBs mapping to the QoS Flows according to the quality requirements corresponding to different QoS flows. As described above, the primary base station sends to the secondary base station the request for adding the secondary base station which carries QoS flow information, the information of the QoS flow mapping to DRB and the quality requirement corresponding to DRB, and the user plane protocol layer is configured by the secondary base station according to the quality of the DRB, including the user plane established in the secondary base station and the user plane in the UE.

The information of the data bearer also includes GTP tunnel ID allocated by the primary base station for receiving the uplink data. If the type of the data bearer is SCG bearer or SCG split bearer, the information of the data bearer also includes GTP tunnel ID allocated by the core network SGW for receiving the uplink data.

(3) Information of split signaling. The information of split signaling includes the identification of split signaling. The split signaling can be configured as a new bearer in the secondary base station, for example, it is identified whether the split signaling is SRB1 or SRB2. By the identification of split signaling, its corresponding user plane can be created the X2 interface. Alternatively, the split signaling is configured in the secondary base station according to the way that the data bearer is split. The secondary base station processes the split signaling as a kind of split data bearer. The secondary base station does not know whether the split signaling or the data bearer is transmitted in the Xn tunnel. Herein, the identification of the split signaling refers to the identification that uses data bearer (such as DRB identification), and the primary base station generates the identification and saves the correspondence between the DRB identification and the signaling;

(4) QoS requirements corresponding to split signaling. For the data sent by the core network, the Quality of Service (QoS) of data is configured by the server of the authentication policy of the core network, sent to the primary base station over the core network, and then sent to the secondary base station by the primary base station. There are no corresponding QoS requirements for RRC signaling. The primary base station needs to generate QoS requirements corresponding to the RRC signaling by itself. For example, the primary base station determines the corresponding Quality of Service (QoS) requirements according to the type of the split signaling (i.e., SRB1 or SRB2), and makes the secondary base station to establish the corresponding user plane according to the QoS requirements, for example, to establish the RLC/MAC protocol layer. The secondary base station also needs to allocate the transport layer information of the user plane in the Xn interface. For example, for each signaling split bearer (i.e. SCG split bearer), the secondary base station allocates GTP tunnel ID.

(5) The configuration information of split signaling. For the data sent by the core network, the Quality of Service (QoS) of data is configured by the server of the authentication policy of the core network, and QoS is sent to the primary base station over the core network, and then is sent to the secondary base station by the primary base station. For the RRC signaling, the core network does not configure the corresponding QoS requirements. The primary base station determines the corresponding specific configuration information according to the type of the split signaling (i.e., SRB1 or SRB2). The primary base station may send the configuration information of the split signaling, such as RLC configuration information including the uplink RLC configuration, the downlink RLC configuration, the priority, and the logical channel and the like, to the secondary base station. The secondary base station configures the corresponding user plane according to the configuration information, such as establishing RLC/MAC protocol layer.

(6) Indication information. The indication information informs the secondary base station whether the split signaling bearer uses the default configuration or informs the secondary base station whether the split signaling bearer uses the default configuration information or the explicit configuration. When the UE accesses the primary base station, the primary base station configures signaling bearers for the UE. Specifically, SRB1 and SRB2 may use the default configuration or use the explicit configuration. The default configuration information is defined in the LTE specification. If the default configuration information is used, specific parameters such as RLC configuration information do not need to be sent to the UE. The UE also configures the user plane according to the defined value in the specification of the LTE wireless interface. If the explicit configuration is used, the primary base station needs to configure specific parameters, such as the configuration information of the RLC. When the split signaling bearer is configured in the secondary base station, the primary base station needs to tell the secondary base station how the split signaling bearer is configured. The default configuration or the explicit configuration is set by the indication information. If the default configuration is set, the secondary base station uses the defined values in the LTE radio interface specification to configure the protocol layer such as RLC, MAC etc. If the explicit configuration is set, the primary base station sends to the secondary base station the configuration information of the user plane, such as the configuration information shown in (5). The configuration information shown in (5) may be contained in RRC container, which is the container for sending RRC related information between the primary base station and the secondary base station, and contains the configuration information of the RRC configured by the primary base station. The secondary base station may analyze the RRC configuration information contained in the container to obtain the configuration information of SRB1 and/or SRB2. Alternatively, the configuration information shown in (5) is not contained in the RRC container, the configuration information shown in (5) is carried by the information in the message requesting for addition so that the secondary base station does not need to analyze the RRC configuration information contained in the container.

Alternatively, when the secondary base station learns that the split signaling bearer needs to be established, the identification of the split signaling bearer carried in the request for setting the secondary base station setup request, such as SRB1 or SRB2, is obtained. By default, the secondary base station uses the default configuration information defined in the LTE specification to configure the user plane, such as using the default RLC configuration parameters defined in the specification of the LTE radio interface to configure the RLC protocol layer. In this way, the split signaling bearer in the secondary base station, such as SRB1, may have different configuration information of the user plane from the bearer configuration information in the primary base station.

The configuration of the user plane is not optimal, but has the advantage of reducing signaling transmission between the primary base station and the secondary base station.

In step 1802, CU of the secondary base station sends the request for the bearer establishment to DU.

After receiving the request for adding the secondary base station, the CU sends the request for the bearer establishment to the DU, wherein the request carries one or more of the following information:

(1) The identification of the cell. One DU may have multiple cells. The identification of the cell indicates in which cell the corresponding bearer is established. The identification of the cell may be a cell-wide unique identification of the entire network or the identification of the cell unique to the DU.

(2) The identification of the bearer. The identification of the user plane between CU and DU is included, for example, a tunnel established between the CU and the DU to output data in a bearer for which the CU and the DU may allocate a GTP tunnel ID. The GTP tunnel ID allocated by the CU is carried in the message of step 1802, and GTP tunnel ID allocated by the DU is carried in the message of step 1803.

(3) The configuration information of the bearer. The configuration information of the bearer includes the configuration information of RLC, MAC, and physical layer.

(4) The indication of whether the bearer needs traffic control or not. The data sent by the bearer may be data or the signaling sent by the primary base station, that is, RRC message sent to the UE. The CU knows whether the data or the signaling sent by the primary base station is sent in the bearer, while the secondary base station does not know the sent content. For the RRC message, because the frequency of sending the RRC message is low and thus traffic control is not needed, the CU informs the control plane whether the DU needs the indication of traffic control. If the data is sent in the bearer, the CU can set in the indication that traffic control is needed. Alternatively, it is indicated that traffic control is not needed via the user plane. For split data bearers and signaling bearers, the user plane may be established between the primary base station and the DU. In this case, the primary base station sends the packets of the user plane to the DU. In the format of the packet in the user plane, the primary base station indicates that the DU does not need to send the packet of traffic control to the primary base station. Alternatively, the user plane may be established between the CU and the DU. The primary base station sends the packet of the user plane to the CU. The CU sends the packet of the user plane to the DU. In the format of the packet of the user plane, the DU is indicated not to send the packet of traffic control to the CU.

(5) Indication information. The indication information indicates the DU whether the split signaling bearer uses the default configuration or indicates the DU whether the split signaling bearer uses the default configuration or the explicit configuration. If the default configuration is used, the specific parameters, such as RLC configuration information, do not need to be sent to the DU. The DU configures the protocol layers, such as RLC, MAC etc., according to the defined value in the LTE specification. If the explicit configuration is set, the CU needs to send the configuration information of some specific user plane, such as the configuration information shown in (3) to the DU.

Alternatively, when the DU learns that the split signaling bearer needs to be established, the identification (i.e., that in (2)) of the bearer included in the request for bearer establishment in the step is set to be the identification of the signaling bearer, such as SRB1 or SRB2. By default, the DU uses the default configuration information defined in the LTE specification to configure the user plane, such as using the default RLC configuration parameters defined in the specification of the LTE radio interface to configure the RLC protocol layer. In this way, for split signaling bearers, such as SRB1, the configuration information of the bearer (that is, that in (3)) does not need to be transmitted from the CU to the DU. The configuration of the user plane in the DU may be different from that of the bearer in the primary base station. The user plane configuration is not optimal, but has the advantage of reducing signaling transmission between the primary base station and the secondary base station. The secondary base station includes two entities, CU and DU.

In step 1803, the DU of the secondary base station sends the response for bearer establishment to the CU.

The DU sends the response for bearer establishment to the CU, wherein the response carries one or more of the following information:

The identification of the bearer which is successfully established;

GTP tunnel ID assigned by the DU for the user plane.

In step 1804, the secondary base station sends the response for adding the secondary base station to the primary base station.

The secondary base station determines the configuration information of the bearer in the UE according to the QoS and the UE capability of the DRB. The configuration information of the secondary bearers or secondary cells of the UE is included in the RRC container by the secondary base station, and the container is forwarded through the primary base station to the UE. According to the configuration, the UE sets the protocols of each layer of the UE, such as the RLC and the MAC layer. The message further carries the identification of the DRB or the identification of the X2 user plane and the information (for example, the tunnel identification) of the transport layer corresponding to the user plane. The response for adding the secondary base station carries one or more of the following information:

(1) RRC container, which contains the configuration information of the UE by the secondary base station. The RRC protocol in the secondary base station determines the configuration information of the data bearer in UE. The configuration information of the UE is contained in the RRC container and sent to the UE via the primary base station. The RRC container may further include the configuration information of the split signaling bearer, such as the identification of the split signaling, and the corresponding configuration information of RLC/MAC. The corresponding configuration information of the RLC/MAC may use the default configuration or use the explicit configuration. The default configuration or the explicit configuration has been described, so it is omitted herein.

(2) The information of the data bearer received by the secondary base station, which includes the identification of the data bearer (E-RAB ID) and GTP tunnel ID allocated by the secondary base station for the data bearer to receive the downlink data;

(3) The information of the split signaling bearer received by the secondary base station includes the identification of the signaling bearer and GTP tunnel ID allocated by the secondary base station for the signaling bearer to receive the downlink signaling data. The message carries the identification for successfully establishing a split signaling bearer, and/or includes the identification for unsuccessfully establishing a signaling bearer.

After receiving the bearer establishment response, the CU sends the response for adding the secondary base station to the DU.

In step 1805, the primary base station sends the request for RRC reconfiguration to the UE.

The primary base station does not parse the RRC container and forwards the RRC container to the UE. The primary base station may add its own configuration information for the UE and send it to the UE along with the configuration information of the secondary base station.

In step 1806, the UE sends the message for completing the RRC reconfiguration to the primary base station.

After the UE is configured successfully, the response is sent to the primary base station. The response may include the response of the configuration information sent in step 1802, that is, the response to the configuration information of the primary base station, and also include the response to the configuration information of the secondary base station. If necessary, the UE also needs to perform the random access procedure with a new secondary base station and synchronize with the new secondary base station. After synchronization, the secondary base station can start sending data to the UE.

In step 1807, the primary base station sends the message for completing the RRC reconfiguration to the secondary base station.

The primary base station notifies the secondary base station of the information that the configuration in the UE has succeeded. Because the UE sends the acknowledgment to the primary base station, the primary base station needs to forward the acknowledgment to the secondary base station. If the primary base station cannot parse the response of the UE to the configuration information of the secondary base station, the primary base station may also forward the response of the UE to the configuration information of the secondary base station to the secondary base station by the RRC container.

At this point, the split signaling bearer establishment process is completed.

In step 1808, the primary base station sends the path switch message to the core network. The path switch message is not required for some types of bearers, for example, the split bearer established in the primary base station is not required to send the message. The SCG bearer or SCG split bearer established in the secondary base station is required to send the message. The message carries the GTP tunnel ID assigned by the secondary base station, and is used to receive the downlink data sent by the core network.

Figure 11:
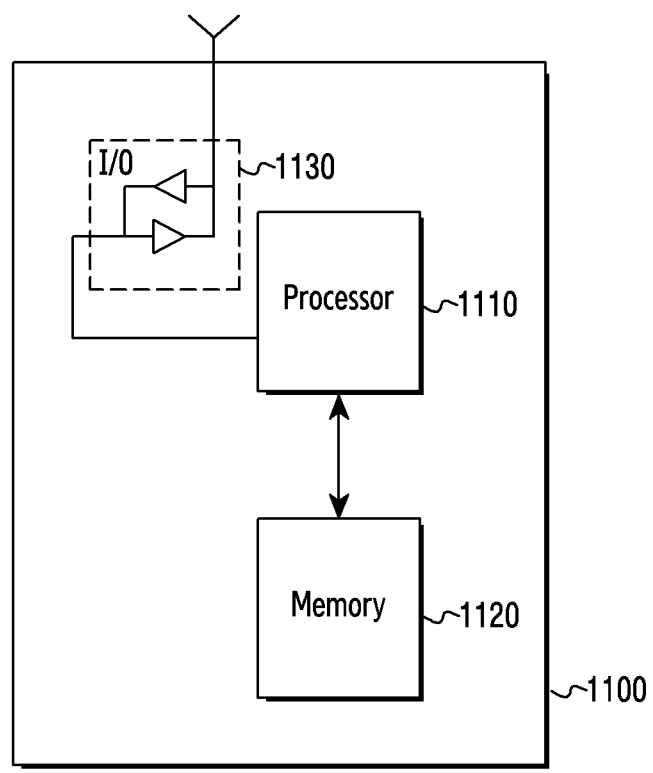
FIG. 11 shows a schematic block diagram of a base station according to an embodiment of the invention.

FIG. 11 schematically shows a block diagram of a base station 700 according to an embodiment of the present disclosure. The base station 700 comprises a processor 710, such as a digital signal processor (DSP). The processor 710 may be a single device or multiple devices for performing various actions according to an embodiment of the present disclosure. The base station 700 may further comprise an input/output (I/O) device 730 for receiving signals from other entities or transmitting signals to other entities.

In addition, the base station 700 comprises a memory 720. The memory 720 may be in form of a non-volatile memory or a volatile memory, such as an electrically erasable programmable read only memory (EEPROM), a flash memory, or the like. The memory 720 stores computer readable instructions that, when being executed by processor 710, cause the processor to perform the method according to an embodiment of the present disclosure.

Figure 12:
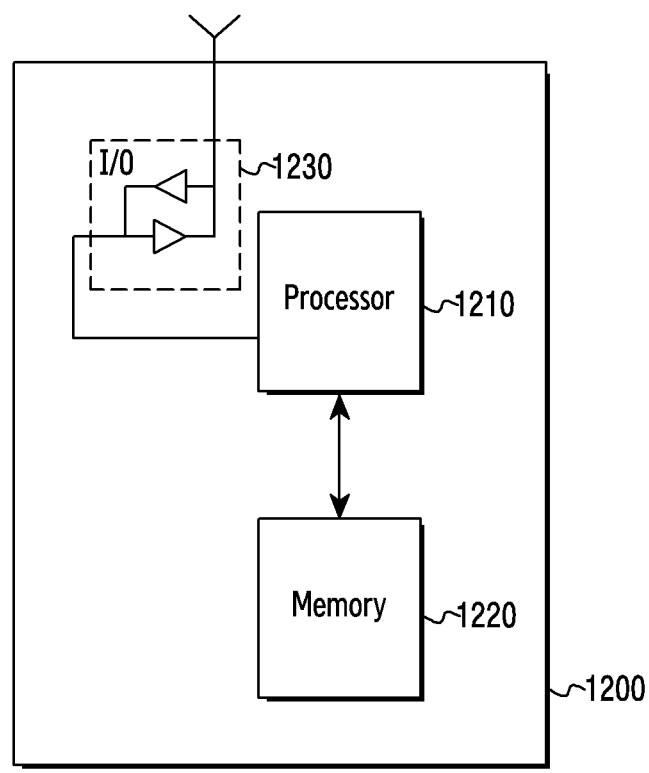
FIG. 12 shows a schematic block diagram of another base station according to an embodiment of the invention.
Figure 13:
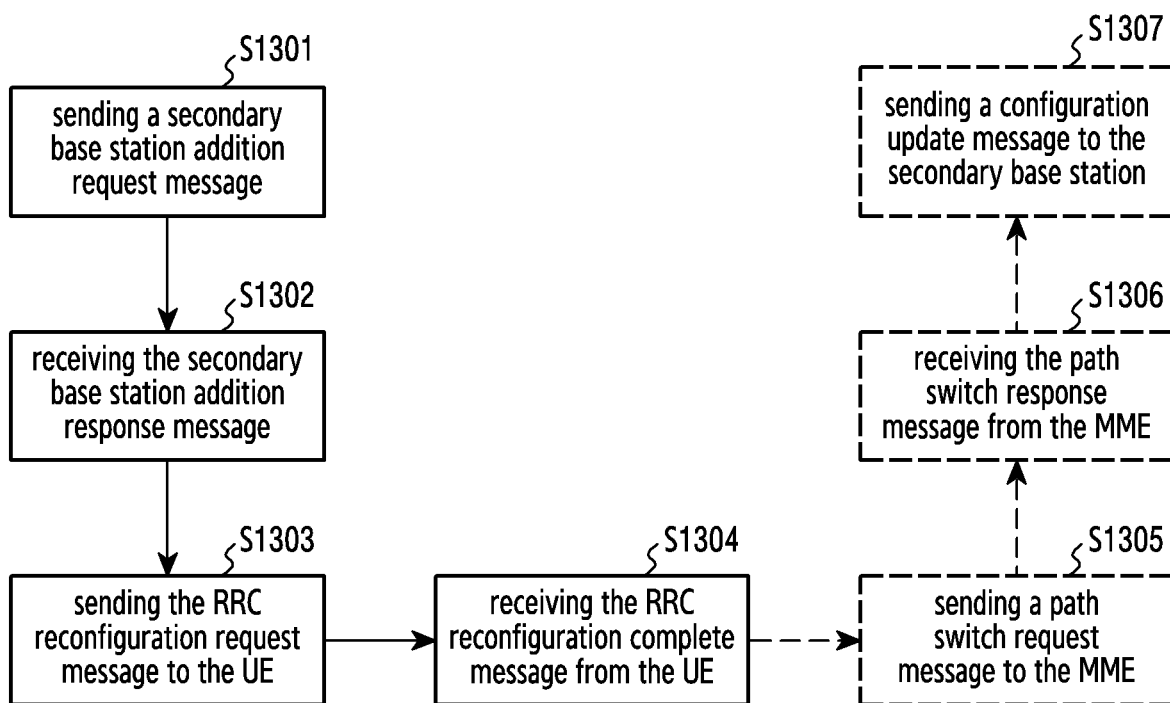
FIG. 13 shows a flowchart of another data transmission method performed by a primary base station according to an embodiment of the present disclosure.

FIG. 12 schematically shows a block diagram of a base station 800 according to an embodiment of the present disclosure. The base station 800 comprises a processor 810, such as a digital signal processor (DSP). The processor 810 may be a single device or multiple devices for performing various actions according to an embodiment of the present disclosure. The base station 800 may further comprise an input/output (I/O) device 830 for receiving signals from other entities or transmitting signals to other entities.

In addition, the base station 800 comprises a memory 820. The memory 820 may be in form of a non-volatile memory or a volatile memory, such as an electrically erasable programmable read only memory (EEPROM), a flash memory, or the like. The memory 820 stores computer readable instructions that, when being executed by processor 810, cause the processor to perform the method according to an embodiment of the present disclosure.

It will be understood by those skilled in the art that embodiments of the present disclosure comprise devices for performing one or more of the operations described in this application. These devices may be specially designed and manufactured for required purposes, or may also comprise known devices in general purpose computers. These devices have computer programs stored therein, which may be selectively activated or reconfigured. Such a computer program may be stored in a device (e.g., a computer) readable medium, or in any type of medium suitable for storing electronic instructions and coupled to a bus. The computer readable medium comprise, but not limited to, any type of discs (including a floppy disk, a hard disk, an optical disk, a CD-ROM, and a magneto-optical disk), a read only memory (ROM), a random access memory (RAM), an erasable programmable read-only memory, an erasable programmable read-only memory (EEPROM), an electrically erasable programmable read-only memory (EEPROM), a flash memory, a magnetic card, or an optical card. That is, a readable medium comprises any medium that stores or transmits information in a form readable by a device (e.g., a computer).

It will be understood by those skilled in the art that each block of the block diagrams and/or structure diagrams and/or flowchart diagrams, and combinations of blocks in the block diagrams and/or structure diagrams and/or flowchart diagrams, can be implemented by computer program instructions. Those skilled in the art may understand that the computer program instructions may be provided to processors of the general purpose computers, special purpose computers or other programmable data processing devices, and the solutions defined in one or more blocks of the block diagrams and/or structure diagrams and/or flowchart diagrams may be realized by the processors of the general purpose computers, special purpose computers or other programmable data processing devices.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

Those skilled in the art can understand that various operations, methods, steps in the flowcharts, measures, and schemes that have been discussed in the present disclosure may be alternated, changed, combined or deleted. Further, other steps, measures, schemes in the various operations, methods, and processes already discussed in the present disclosure may also be alternated, changed, rearranged, disassembled, combined or deleted. Further, steps, measures and solutions in the prior art which have various operations, methods and flows disclosed in the present disclosure may also be alternated, changed, rearranged, decomposed, combined or deleted.

The above description is only some embodiments of the present disclosure, and it should be noted that those skilled in the art may make some improvements and modifications to the embodiments without departing from the principle of the present disclosure, and these improvements and modifications should be regarded as within the protection scope of the present disclosure.

The invention claimed is:

1. A method for establishing a secondary cell group (SCG) split bearer in a dual connectivity between different radio access technologies (RATs) in a wireless communication system, the method performed by a primary base station supporting a first RAT comprising:

transmitting, to a secondary base station supporting a second RAT, a first message for requesting addition of the secondary base station, wherein the first message includes a first parameter about quality of service (QoS), which is a full quality requirement parameter received from a core network of the first RAT, and a second parameter associated with QoS that is admittable by a master cell group (MCG) determined by the primary base station for establishing the SCG split bearer; and receiving, from the secondary base station, a second message, wherein the second message includes a third parameter about QoS to be provided by the MCG determined by the secondary base station, wherein the third parameter does not exceed the second parameter, and wherein the first RAT is $4^{th}$ generation (4G) long term evolution (LTE) and the second RAT is $5^{th}$ generation (5G) new radio (NR).

2. The method of claim 1, wherein the first message comprises information associated with a type of a bearer.

3. The method of claim 1, wherein a QoS requirement for bearers of the primary base station and the secondary base station is guaranteed according to a sum of resources provided by the MCG and secondary cell group (SCG).

4. A method for establishing a secondary cell group (SCG) split bearer in a dual connectivity between different radio access technologies (RATs) in a wireless communication system, the method performed by a secondary base station supporting a second RAT comprising:

receiving, from a primary base station supporting a first RAT, a first message for requesting addition of the secondary base station, wherein the first message includes a first parameter about quality of service (QoS), which is a full quality requirement parameter received from a core network of the first RAT, and a second parameter associated with QoS that is admittable by a master cell group (MCG) determined by the primary base station of the MCG for establishing the SCG split bearer; and transmitting, to the primary base station, a second message, wherein the second message comprises a third parameter about QoS to be provided by the MCG determined by the secondary base station, wherein the third parameter does not exceed the second parameter, and wherein the first RAT is $4^{th}$ generation (4G) long term evolution (LTE) and the second RAT is $5^{th}$ generation (5G) new radio (NR).

5. The method of claim 4, wherein the first message comprises information associated with a type of a bearer.

6. The method of claim 4, wherein a QoS requirement for bearers of the primary base station and the secondary base station is guaranteed according to a sum of resources provided by the MCG and secondary cell group (SCG).

7. The method of claim 4, further comprising:

transmitting broadcast information notifying that the secondary base station only supports serving per a network identity and the secondary base station is restricted from serving user equipments (UEs) which do not support the network identity.

8. A primary base station for establishing a secondary cell group (SCG) split bearer in a dual connectivity between different radio access technologies (RATs) in a wireless communication system, the primary base station supporting a first RAT comprising:
- a transceiver; and
- at least one processor coupled to the transceiver and configured to:
  - transmit, to a secondary base station supporting a second RAT, a first message for requesting addition of the secondary base station, wherein the first message includes a first parameter about quality of service (QoS), which is a full quality requirement parameter received from a core network of the first RAT, and a second parameter associated with QoS that is admittable by master cell group (MCG) determined by the primary base station of the MCG for establishing the SCG split bearer, and
  - receive, from the secondary base station, a second message,
  - wherein the second message includes a third parameter about QoS to be provided by the MCG determined by the secondary base station,
  - wherein the third parameter does not exceed the second parameter, and
  - wherein the first RAT is $4^{th}$ generation (4G) long term evolution (LTE) and the second RAT is $5^{th}$ generation (5G) new radio (NR).

9. The primary base station of claim 8, wherein the first message comprises information associated with a type of a bearer.

10. The primary base station of claim 8, wherein a QoS requirement for bearers of the primary base station and the secondary base station is guaranteed according to a sum of resources provided by the MCG and secondary cell group (SCG).

* * * * *